US012261836B1

(12) United States Patent
Healy et al.

(10) Patent No.: US 12,261,836 B1
(45) Date of Patent: Mar. 25, 2025

(54) MULTI-FACTOR AUTHENTICATION WORKFLOW MANAGEMENT WITH DISTRIBUTED ACCESS

(71) Applicant: Station 70 Inc., Dickson, TN (US)

(72) Inventors: Adam Healy, Dickson, TN (US); Adam C. Everspaugh, Evanson, IL (US)

(73) Assignee: Station 70 Inc., Dickson, TN (US)

( * ) Notice: Subject to any disclaimer, the term of this patent is extended or adjusted under 35 U.S.C. 154(b) by 0 days.

(21) Appl. No.: 18/823,435

(22) Filed: Sep. 3, 2024

(51) Int. Cl.
*H04L 9/40* (2022.01)
(52) U.S. Cl.
CPC .... *H04L 63/0838* (2013.01); *H04L 2463/082* (2013.01)
(58) Field of Classification Search
None
See application file for complete search history.

(56) References Cited

U.S. PATENT DOCUMENTS 10,516,527 B1 * 12/2019 Machani ............... H04L 9/0625

FOREIGN PATENT DOCUMENTS

| CN | 107005578 | * | 9/2017 |
| CN | 110290094 | * | 9/2019 |
| CN | 114070564 | * | 2/2022 |

* cited by examiner

*Primary Examiner* — Piotr Poltorak
(74) *Attorney, Agent, or Firm* — Van Pelt, Yi & James LLP

(57) ABSTRACT

Multi-factor authentication workflow management with distributed access is disclosed, including: receiving, from a device, a request to complete a multi-factor authentication (MFA) process for an account at a source service platform; verifying, based at least in part on a security policy, that a user associated with the request is included in a set of authorized users that is permitted to access an encrypted secret key corresponding to the account at the source service platform; determining that a received key share included in the request can be combined with a stored key share to decrypt the encrypted secret key; and causing a passcode corresponding to the MFA process for the account at the source service platform to be generated for the device based at least in part on the decrypted secret key.

20 Claims, 16 Drawing Sheets

```
{"acmeSecurityPolicy":[
    {"securityType":"3", "secretID":"7u2pt8i" },
    {"dateApplied":"2024-05-23", "timeApplied":"19:50:47"}
    {"appliedBy":"john.doe", "company":"acme" }
    {"quorumUserT":"2", "quorumUserN":"3" }
    {"quorumUserNMember1":"jack.smith@acme.com", "quorumUserNMember2":"bob.mallory@acme.com" }
    {"quorumUserNMember3":"alice.warner@acme.com", "quorumUserNMember4":"bill.riley@acme.com" }
    {"quorumUserNMember5":"eve.jackson@acme.com"}
    {"quorumApproverT":"2", "quorumApproverN":"5" }
    {"quorumApproverNMember1":"jack.miller@acme.com", "quorumApproverNMember2":"bob.jones@acme.com" }
    {"quorumApproverNMember3":"alice.perkins@acme.com"}
]}
```

MULTI-FACTOR AUTHENTICATION WORKFLOW MANAGEMENT WITH DISTRIBUTED ACCESS

BACKGROUND OF THE INVENTION

In certain scenarios, more than one person needs to share an account of an application. For example, one such scenario may arise when access to an account of a particular software service needs to alternate among a team of multiple users at an enterprise or across disparate enterprises such as partners and affiliates. If a multi-factor authentication secret key (e.g., that is embodied in a quick-response (QR) code) to the account were linked to only one user's device, then other users that are required to have access to an application but do not have access to that user's device could not use the same account, which is inconvenient. As a result, in some instances, copies of the authentication secret key to one account of a service are locally stored or made accessible to multiple devices, which is not secure because the secret key can be easily accessed by unauthorized parties or storage of the secret key in this manner may be prohibited by organizational policy. It would be desirable to manage the multi-factor authentication secret keys in a secure manner that enables distributed access.

BRIEF DESCRIPTION OF THE DRAWINGS

Various embodiments of the invention are disclosed in the following detailed description and the accompanying drawings.

FIG. 11 is a diagram showing an example of a security policy in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
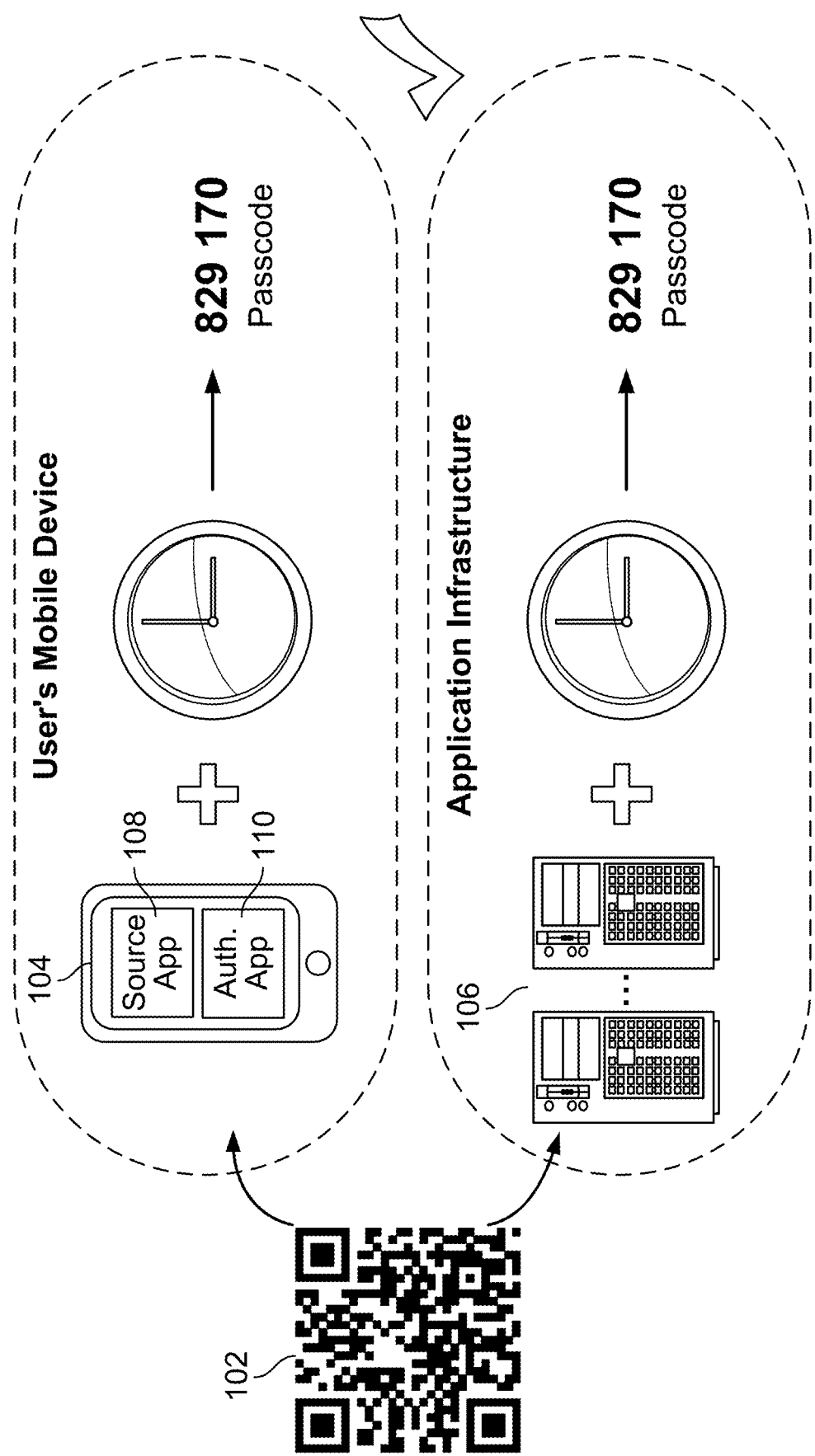
FIG. 1 is a diagram showing an example of using a time-based one-time password (TOTP) scheme in the context of linking a user's mobile device to access an application that is protected by TOTP multi-factor authentication.

FIG. 1 is a diagram showing an example of using a time-based one-time password (TOTP) scheme in the context of linking a user's mobile device to access an application that is protected by TOTP multi-factor authentication. In the example of FIG. 1, the TOTP scheme that is documented in the Internet Engineering Task Force's (IETF) request for change (RFC) 6238. When the user of mobile device 104 enrolls into a multi-factor authentication (MFA) scheme for source application (app) 108 that is executing on mobile device 104 (or alternatively to a web browser-based application) to a service provided by server(s) 106 via a particular user account, server(s) 106 is configured to generate quick-response (QR) code 102. QR code 102 encodes several pieces of information including a TOTP secret key (e.g., an alpha numeric string), a username of the account, an identifier of the issuer, and the type (e.g., TOTP). Additionally, QR code 102 may also include an algorithm type, options for 6 or 8 digits, and a valid period. The user can use authenticator app 110 (which is executing on mobile device 104) to capture QR code 102. Server(s) 106 can store QR code 102 and/or its encoded information in a manner that is associated with the account. When the user next signs into that account via source app 108 (or another app that is related to the same service but executing on a different device), the user can open authenticator app 110 to request a current TOTP passcode corresponding to the account to complete the MFA process. The user will then input the TOTP passcode into source app 108. Authenticator app 110 computes the TOTP passcode based on a function of the TOTP secret key (that was derived from QR code 102) and the current time. In response to the user's sign-in to source app 108, server(s) 106 are configured to separately compute the TOTP passcode corresponding to that account using a locally stored or otherwise accessible copy of the TOTP secret key and the current time. Server(s) 106 will then compare the TOTP passcode that it received from authenticator app 110 of mobile device 102 to the TOTP passcode that it had computed to determine whether the two passcodes match. If server(s) 106 determine that the two passcodes match, then server(s) 106 will grant the user access to the service via source app 108. As shown in FIG. 1, the TOTP secret key is a critical piece of information that enables a user to complete the MFA process in accessing a software service and is therefore highly sensitive data that warrants strong protections.

However, currently, no current authentication service (e.g., Azure Active Directory®, Okta®, etc.) or third-party MFA provider (e.g., Authy®, Duo®, etc.) supports cryptographic enforcement using a distributed mechanism to protect the TOTP secret key. This creates centralization risk and has resulted in a lesser security posture versus what may be desirable by a given enterprise with users of the software service that offers MFA using the TOTP scheme. Additionally, due to the lack of ability to manage the TOTP secret key in a distributed manner, this may result in shortcuts being made by individual users in cases where a service account or otherwise shared account is not properly secured. For example, these detrimental shortcuts may be involved either by disabling MFA outright at a service or by sharing the original TOTP secret key using insecure means not purpose built for such sensitive data (e.g., Slack®, 1Password®, SharePoint®, etc.). Lastly, in the event that an enterprise needs to store an especially sensitive TOTP secret key (e.g., MFA access for a root account within a payments or healthcare context), there currently exists no solution to not only possibly share/distribute that TOTP secret key amongst numerous authorized users, but also no way to enforce a cryptographic approval workflow prior to granting an individual user access or granting a group of users' access.

Embodiments of multi-factor authentication among a group of authorized users are described herein. A request to complete a multi-factor authentication (MFA) process at a source service platform is received from a device. For example, the MFA process comprising a prompt for a (time sensitive) passcode was initiated by the source service platform in response to a user of the device submitting the correct credentials (e.g., login name and password) to an account at the source service platform. In some embodiments, the request to complete the MFA process includes at least a user identifier (e.g., an email, a username, a login name), an account identifier, and a key share related to a TOTP secret key. The information associated with the request is compared to one or more stored policies to verify that the identified user is included in a set of users that have been authorized to use the identified account of the source service platform. For example, the security policies (e.g., which describe which accounts can be shared among which specified one or more authorized users) are customizable by the one or more organizations (e.g., enterprises). After the user is verified as having authorization to use the account, a stored key share corresponding to the TOTP secret key associated with the account is obtained. The stored key share is then combined with the key share that is received as part of the request to recover a private key. The encrypted TOTP secret key associated with the account is obtained from a secure storage. The TOTP secret key had previously been encrypted using the public key that was generated in a pair to the recovered private key. As such, the encrypted TOTP secret key is decrypted using the received private key. A TOTP passcode is then caused to be generated for the device/request based on the recovered TOTP secret key and the current time. The user can then submit the TOTP passcode to the source service platform to authenticate themselves and then be granted access to the account at that platform.

Figure 2:
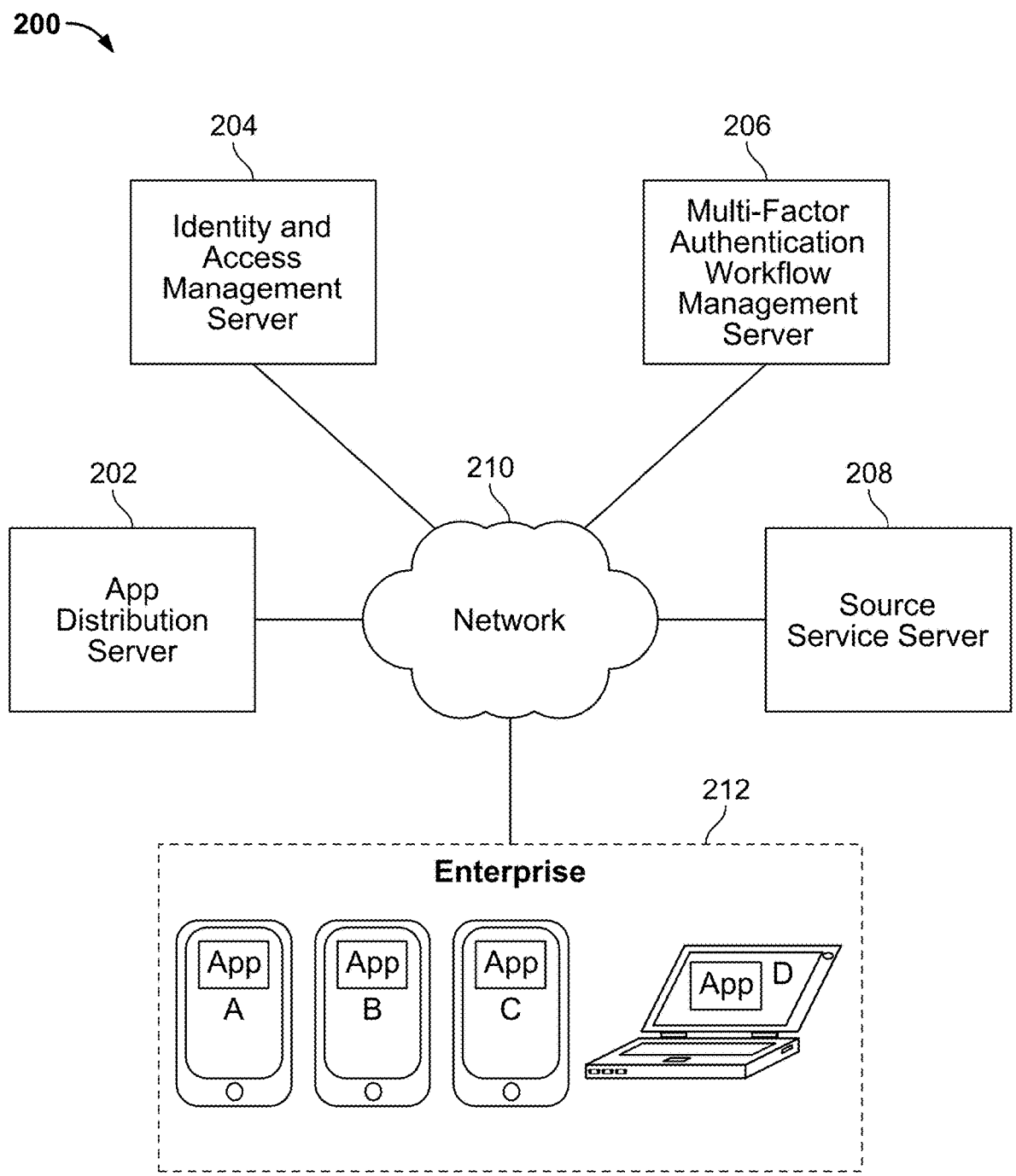
FIG. 2 is a diagram showing an embodiment of a system for multi-factor authentication workflow management.

FIG. 2 is a diagram showing an embodiment of a system for multi-factor authentication workflow management. As shown in FIG. 2, system 200 includes app distribution server 202, identity and access management server 204, multi-factor authentication (MFA) workflow management server 206, source service server 208, network 210, and devices associated with enterprise organization 212. Each of app distribution server 202, identity and access management server 204, MFA workflow management server 206, source service server 208, and the devices associated with enterprise organization 212 communicate to each other over network 210. Network 210 includes data and/or telecommunication networks.

Devices associated with enterprise organization 212 are assigned to users associated with enterprise organization 212. For example, users associated with enterprise organization 212 may include employees and contractors. As shown in FIG. 2, the devices associated with enterprise organization 212 include mobile devices (e.g., phones or tablets) such as mobile devices A, B, and C and laptop computers such as laptop computer D. Administrator user(s) of enterprise organization 212 will onboard enterprise organization 212 with MFA workflow management server 206. Onboarding enterprise organization 212 with MFA workflow management server 206 may include configuring the enterprise's MFA workflow management account to specify for which source service platforms MFA workflow management server 206 should manage the workflow and access controls to the secret keys thereof. Onboarding enterprise organization 212 with MFA workflow management server 206 may also include configuring the enterprise's account to connect to identity and access management server 204, which currently provides single sign-on and other identity/access management services for enterprise organization 212.

After such onboarding, the authenticator app that is associated with MFA workflow management server 206 is distributed to devices associated with enterprise organization 212 via app distribution server 202. For example, the authenticator app can be implemented using Go. For example, app distribution server 202 comprises an app store (e.g., Google Play®, Apple App Store®, an organizationally-managed app store provided by enterprise organization 212) or a mobile device management (MDM) provisional service (e.g., Microsoft®). Put another way, each device associated with enterprise organization 212 can download a corresponding instance of the authenticator app (which is shown simply as "app" on each of devices A, B, C, and D) that is provided by MFA workflow management server 206 from app distribution server 202. An enterprise user can then access the authenticator app on their respective device using their enterprise organization credentials that is associated with single sign-on across multiple source applications whose access is managed by identity and access management server 204 for enterprise organization 212. For example, in the event that the enterprise user departs enterprise organization 212, the user's profile can be updated at identity and access management server 204 such that the user's credentials will no longer allow the user to access the authenticator app, which also advantageously prevents the user from using the authenticator app to complete MFA processes associated with enterprise applications (which the departed user should no longer have access to). Access may also be provided by internal authentication services provided by MFA workflow management server 206 if enterprise organization 212 does not internally possess a service similar to identity and access management server 204. As such, identity and access management server 204 stores information that describes whether an enterprise user is permitted to have permission to access an enterprise application such as the authenticator app of MFA workflow management server 206, while MFA workflow management server 206 in turn provides access controls to the TOTP passcodes that are needed to complete the MFA process for other enterprise-level applications/services. Put another way, in some embodiments, MFA workflow management server 206 can extend MFA services provided, at least in part, by identity and access management server 204 for enterprise organization 212.

MFA workflow management server 206 is configured to enforce workflows for enterprise devices' access to MFA-related time-sensitive passcodes for accounts to one or more enterprise service platforms (e.g., such as the source service platform provided by source service server 208) for which MFA is required. As will be described in further detail below, MFA workflow management server 206 is configured to manage access to TOTP passcodes and/or securely share access to a TOTP secret key corresponding to a source service account across a set of authorized users of an enterprise (e.g., enterprise organization 212) and/or enforcing approval workflows on the access and additional sharing/distribution of TOTP secret keys. In various embodiments, MFA workflow management server 206 stores security policies that have been configured by or for enterprises (e.g., enterprise organization 212). For example, a security policy can specify one or more of the following: an enterprise identifier, a source service identifier, a source service account identifier, and an account access mode such as "single user access," "single user access with an approval threshold," "multiple user access without an approval threshold," or "multiple user access with an approval threshold." If the security policy specifies that the account should be associated with "multiple user access" (with or without an approval threshold), then the policy should also specify the identifiers of all authorized users of that (shared) account. If the security policy specifies that the account should be associated with "single or multiple user access with an approval threshold," then the policy should also additionally specify the identifiers of all approver users and a set of approval criteria. For instance, for an especially sensitive source service, it may be desired to have designated approver users double check or confirm that another user that is requesting to access the service should be granted access before a TOTP passcode can be generated for the requesting user. For example, a set of approval criteria describes how many or what proportion of the approver users need to approve the request prior to providing a TOTP passcode to be generated for the requesting, authorized user on the account. In various embodiments, each encrypted TOTP secret key that is stored by MFA workflow management server 206 for a particular source service account is associated with a stored security policy.

The following describes an example of enrolling enterprise organization 212's account with source service server 208 with the MFA workflow management server 206:

Alice is an employee of enterprise organization 212 (Acme Corp) and creates an enterprise account for an enterprise service (e.g., enterprise software/application) that is provided by source service server 208. For example, Alice can create such an account at either a mobile app or a web browser-based application that is provided by source service server 208. The account is created with at least a login name and a password. For example, the login is an enterprise email address that was created for the use of this particular source service. In a specific example, source service server 208 provides enterprise payroll services and so Alice has provided "payroll@acme.com" as the login name for the account. To enable MFA for access to the "payroll@acme.com" account at the payroll service, source service server 208 is configured to generate a TOTP secret key corresponding to the account. To share the TOTP secret key, source service server 208 encodes the TOTP secret key (with other information such as a source service identifier) into a QR code that is presented to Alice at the device (e.g., a laptop, which is not shown in FIG. 1) that Alice had used to create the account. Alice then opens the MFA workflow management authenticator app (shown as simply "App") on her mobile device (Device A) and then scans the QR code that is presented at Alice's laptop. In response to scanning the QR code, the authenticator app executing on a mobile device (Device A) then transmits the QR code to MFA workflow management server 206. MFA workflow management server 206 is configured to derive the TOTP secret key from the QR code. MFA workflow management server 206 is configured to obtain or generate a public-private key pair corresponding to the TOTP secret key. MFA workflow management server 206 is then configured to encrypt the TOTP secret key associated with the source service account using the public key of the pair and then store the encrypted TOTP secret key in a secure storage. MFA workflow management server 206 is configured to split the private key of the pair into at least two portions (which are sometimes referred to as "key shares") using a security access model that enables the private key to be recovered using some of the key shares. In some other embodiments, MFA workflow management server 206 can use other forms of symmetric or public key encryption schemes to achieve the same multi-component access model without splitting private keys. This may include ciphertext-based or other controls enforced by MFA workflow management server 206.

MFA workflow management server 206 is configured to associate the source service account with a security policy. For example, the security policy can be created at least in part by Alice interacting with a series of user interfaces that are provided through the authenticator app at Device A.

In the event that the security policy indicates that the source service account is associated with "single user access" (with or without an approval threshold) meaning that Alice is the sole authorized user of the account, then MFA workflow management server 206 is configured to send one of the key shares to Device A, where the received key share will be stored in a secure enclave (not shown in FIG. 2) of Device A. As such, the security policy will specify that only Alice is an authorized user of the "payroll@acme.com" account.

In the event that the security policy indicates that the source service account is associated with "multiple user access" (with or without an approval threshold) meaning that other user(s) in addition to Alice are authorized users that share the account, then MFA workflow management server 206 is configured to send a copy of one of the key shares to Device A and also to the device of each other authorized user of the account, where the received key share will be stored in a secure enclave (not shown in FIG. 2) in each recipient device. For example, Bob and Carly both work with Alice in the accounting department of enterprise organization 212 (Acme) and therefore, both need access to the "payroll@acme.com" account at the payroll service provided by source service server 208. As such, the security policy will specify that Alice, Bob, and Carly are all authorized users of the "payroll@acme.com" account.

As will be described in further detail below, the key share that is stored in a secure enclave of an authorized user of the source service account will be sent to MFA workflow management server 206 during an MFA process to access the account.

The following describes an example of enabling an authorized user's access to enterprise organization 212's account with source service server 208 with MFA workflow management server 206, after the account had been enrolled with MFA workflow management server 206 as described above:

Assume that the "payroll@acme.com" account has been associated with a security policy maintained by MFA workflow management server 206 that specified an access mode with "multiple user access" and including authorized users Alice, Bob, and Carly. Some time after the "payroll@acme.com" account is enrolled into MFA with source service server 208 by Alice, as described above, Bob needs to access the "payroll@acme.com" account. As such, Bob opens on a device (e.g., his laptop) a mobile app or web browser-based application associated with the payroll service provided by source service server 208, enters the credentials (e.g., username and password) for the account, and is then prompted by the payroll service to input a TOTP passcode to complete the MFA process. Bob then opens the authenticator app associated with MFA workflow management server 206 that is executing on his mobile device (Device B) to request the TOTP passcode corresponding to the "payroll@acme.com" account. The request that is sent from Device B to MFA workflow management server 206 includes at least Bob's identifier and the key share that was previously distributed from MFA workflow management server 206 to the device of each authorized user (as denoted in the associated security policy). In response to the request, MFA workflow management server 206 is then configured to determine a security policy that is associated with the "payroll@acme.com" account. Based on this security policy, MFA workflow management server 206 is configured to confirm that Bob is an authorized user and also whether "an approval threshold" is needed before the TOTP passcode can be generated for Bob.

In the event that the obtained security policy indicates that the "payroll@acme.com" account is associated with the "multiple user access with an approval threshold" access mode, then MFA workflow management server 206 is configured to determine the one or more approver users that are identified in the policy. MFA workflow management server 206 is then configured to send prompts/notifications to each approver user (e.g., to the respective devices or via another communication channel) to solicit approval (e.g., within a given time interval) for Bob's access to the "payroll@acme.com" account associated with the payroll service provided by source service server 208. For example, the manager of the accounting department at enterprise organization 212, Dave, is one such approver user and receives an approval prompt at his registered device of Device D. Dave can confirm his approval via the prompt and submit his response over Device D. After the given time interval elapses, MFA workflow management server 206 is configured to determine the amount/number of approvals that it has received from the approver user(s) that meets the set of approval criteria as described in the security policy. For example, the set of approval criteria dictates that at least half of the approver users must approve the request in order to cause the TOTP passcode to be generated for the requesting, authorized user. If the set of approval criteria is met based on the received approvals, then MFA workflow management server 206 is configured to cause the TOTP passcode to be generated for the requesting, authorized user. But if the set of approval criteria is not met based on the received approvals, then MFA workflow management server 206 will not cause the TOTP passcode to be generated for the requesting, authorized user. As will be described in further detail below, MFA workflow management server 206 is configured to cause the TOTP passcode to be generated for a requesting, authorized user by combining the key share that is received with the request from the requesting device with another key share that is stored by MFA workflow management server 206 to recover a private key. MFA workflow management server 206 is configured to use the private key to decrypt the encrypted TOTP secret key associated with the "payroll@acme.com" account. With the recovered/decrypted TOTP secret key, in some embodiments, MFA workflow management server 206 is configured to generate a TOTP passcode based on the current time and send the TOTP passcode to Bob's device, Device B. The TOTP passcode will be displayed within the authenticator app executing at Device B and then Bob can input the TOTP passcode into the source application associated with source service server 208 to access the source service account associated with "payroll@acme.com."

In the event that the obtained security policy indicates that the "payroll@acme.com" account is associated with the "multiple user access" but without an approval threshold," then MFA workflow management server 206 is configured to cause the TOTP passcode to be generated for authorized user Bob (as described above), without needing to first prompt any approver users for a sufficient amount of approval.

While the example of Bob's access to enterprise organization 212's account with source service server 208 with the MFA workflow management server 206 is described above, authorized user Carly would be able to obtain the current TOTP passcode to complete the MFA for the account from MFA workflow management server 206 in the same way as Bob.

As described with system 200, MFA workflow management server 206 will provide a TOTP authenticator app that can leverage common frameworks (e.g., RFC 6238 framework), thus enabling existing enterprises to implement with minimal to no changes to their internal services and applications. As described herein, in various embodiments, MFA workflow management server 206's authenticator app will allow users or enterprise administrators to enroll all or a subset of their enterprise applications into different workflows depending on the security need. This can include single user access, multiple user access, and single or multiple user access with configurable approval workflows for access to the TOTP passcode associated with a particular account at a source service platform. These settings can be set at the individual secret level or at the enterprise level managed by an enterprise administrator. Also, as described with system 200, a source service account's TOTP secret key that is encoded in a QR code that is sent from source service server 208 is stored (e.g., long-term) at a secure storage accessible by MFA workflow management server 206 and is not stored (e.g., long-term) locally at or otherwise directly accessible by any device of enterprise organization 212. Overall, system 200 manages MFA secret keys in a manner that enables both 1) approved distributed access to multiple parties in a secure manner; and 2) workflow policies to require real-time approvals for an organization's most sensitive services in a secure manner.

Figure 3:
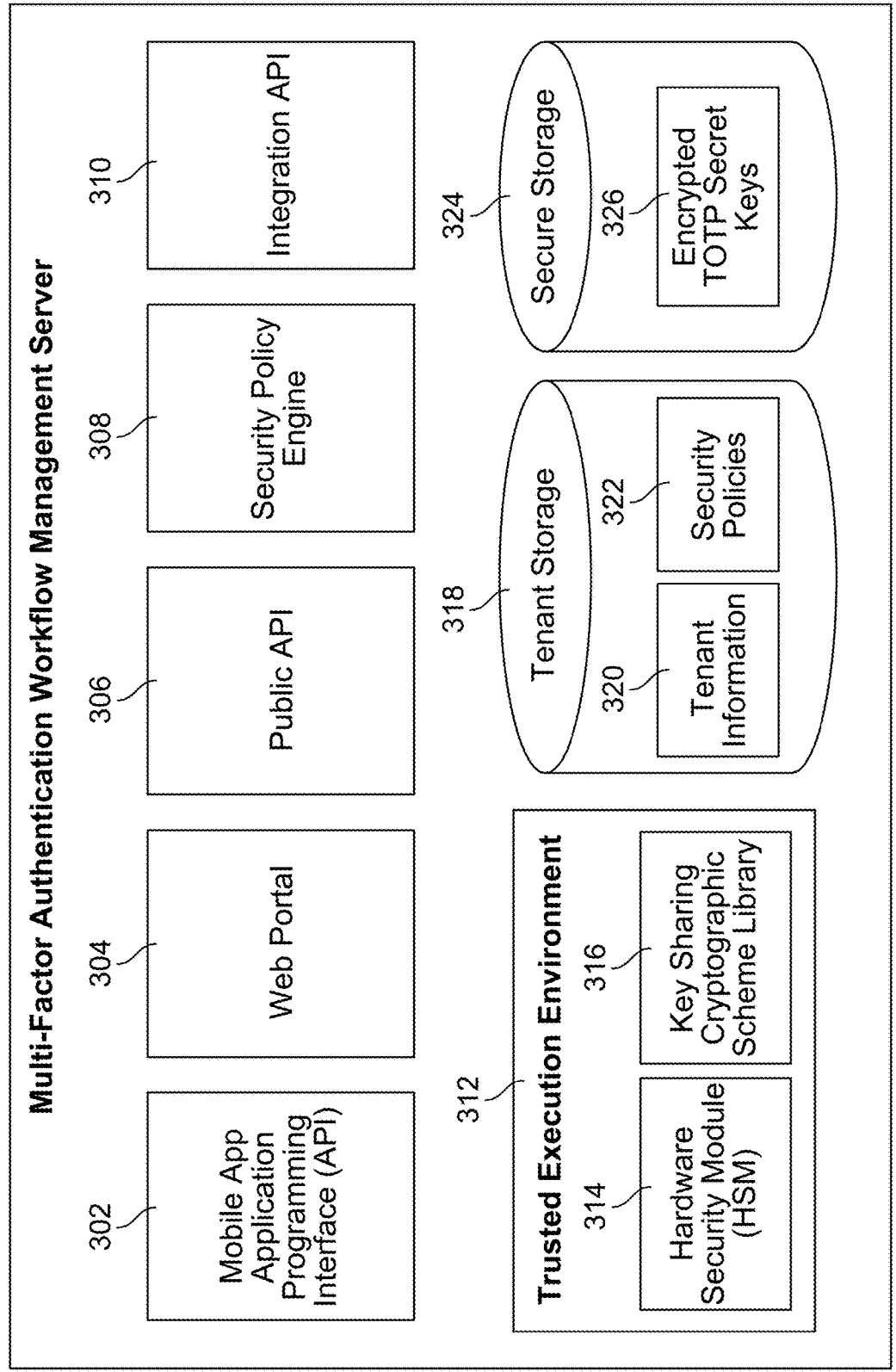
FIG. 3 is a diagram showing an example MFA workflow management server in accordance with some embodiments.

FIG. 3 is a diagram showing an example MFA workflow management server in accordance with some embodiments. In some embodiments, MFA workflow management server 206 of FIG. 2 may be implemented, at least in part, using the example MFA workflow management server of FIG. 3. As shown in FIG. 3, the example MFA workflow management server includes mobile app application programming interface (API) 302, web portal 304, public API 306, security policy engine 308, integration API 310, trusted execution environment 312, tenant storage 318, and secure storage 324.

Mobile app API 302 is configured to be used by authenticator apps executing at (e.g., enterprise) devices to facilitate a (e.g., enterprise) user's request to enroll a TOTP secret key associated with a source service account into the MFA workflow management service. For example, mobile app API 302 may be implemented using FastAPI. In some embodiments, an enrollment request received from an authenticator app executing at a device (not shown) includes at least a QR code (or the TOTP secret key derived from the QR code) and an identifier associated with the source service account. Mobile app API 302 is configured to send the TOTP secret key that is derived from the QR code to hardware security module (HSM) 314 of trusted execution environment 312, which will trigger HSM 314 to generate a public-private key pair. For example, trusted execution environment 312 is implemented using Amazon Web Services (AWS) Nitro Enclaves® and HSM 314 is implemented using AWS CloudHSM® or physically hosted using Gemalto® HSMs. Trusted execution environment 312 runs the private key of the public-private key pair through a key sharing cryptographic scheme, such as a multi-party computation (MPC) process from key sharing cryptographic scheme library 316, to generate two or more key shares to enable an X of Y security access model. In some embodiments, the 2 of 3 security access model is used and so three key shares are generated from the private key corresponding to a TOTP secret key. The three key shares are cryptographic shares, any two of which are required (in the 2 of 3 security access model) for access to the TOTP secret key and ultimately the user-facing corresponding TOTP passcode. Trusted execution environment 312 then writes a first key share back to HSM 314, writes a second key share to a semi-offline HSM possibly for failover and backup purposes, and then sends the third key share back to the device from which the enrollment request was received. The third key share that is sent back to the device from which the enrollment request was received will be stored in a secure enclave of the device and will be accessible only by the authenticator app. Trusted execution environment 312 is also configured to encrypt (or "wrap") the TOTP secret key using the public key of the public-private key pair and then store the encrypted TOTP secret key with encrypted TOTP secret keys 326 of secure storage 324. For example, secure storage 324 may be implemented with AWS relational database service (RDS) Postgres®. In some embodiments, TOTP secret keys and key shares are stored in different (e.g., logically isolated) secure storages by the MFA workflow management server to provide data security in the event of a data breach.

At some point, the TOTP secret key that is requested to be enrolled is, by security policy engine 308, associated with a security policy stored at security policies 322 of tenant storage 318. For example, security policy engine 308 may be implemented using Python running in AWS Lamba®. The security policy specifies information such as an enterprise identifier, a source service identifier, a source service account identifier, and an account access mode (e.g., single user access, multiple user access, with or without an approval threshold). Trusted execution environment 312 is configured to push down/distribute a copy of a key share that is derived from the private key corresponding to a TOTP secret key to the registered device of each authorized user of the account in accordance with the security policy. Tenant storage 318 may store information at tenant information 320 associated with each of its tenants and where each tenant is an organization such as an enterprise, for example. For example, tenant information 320 stores enterprise-level MFA workflow settings for each tenant. In some embodiments, the security policies of security policies 322 are associated with different tenants such that only security policies that are associated with a particular tenant/enterprise can be associated with TOTP secret keys associated with source service accounts corresponding to that tenant/enterprise. For example, tenant storage 318 may be implemented with AWS relational database service (RDS) Postgres®.

Mobile app API 302 is also configured to facilitate a (e.g., enterprise) user's request to receive a TOTP passcode (that is generated from a previously enrolled TOTP secret key) for a source service account to complete an MFA process. The access request includes at least an identifier of the requesting user and a key share that was stored (in the secure enclave) at the device from which the request originated. In response to the user's request to access the source service account, security policy engine 308 is configured to verify that the identifier associated with the requesting user matches the identifier of an authorized user from the security policy (stored at security policies 322 of tenant storage 318) to which the account's corresponding TOTP secret key had previously been enrolled. If the requesting user is validated as an authorized user in the security policy, then it is further determined whether the security policy indicated an access mode that required an approval threshold. If an approval threshold is required, then security policy engine 308 can prompt the approver user(s) that are specified in the policy to obtain the needed approvals before proceeding to allow trusted execution environment 312 to access HSM 314 to obtain a stored key share corresponding to the account/TOTP secret key. Trusted execution environment 312 is configured to combine the received key share (from the access request) with the key share that is obtained from HSM 314 using key sharing cryptographic scheme library 316 to recover the private key. Trusted execution environment 312 is also configured to retrieve the encrypted TOTP secret key that was stored at secure storage 324 and then decrypt the encrypted TOTP secret key using the recovered private key. In some embodiments, trusted execution environment 312 can then generate the TOTP passcode using the current time and the decrypted TOTP secret key and mobile app API 302 is used to transmit the TOTP passcode back to the requesting device.

Web portal 304 provides a web browser-based authenticator app for enrollment and access requests that are received from laptop and desktop types of devices, for example. For example, web portal 304 may be implemented using Svelte. Public API 306 facilitates TOTP secret key enroll requests and source service account access requests as described above for mobile app API 302 but only for requests that are received at web portal 304. For example, public API 306 may be implemented using FastAPI.

Integration API 310 is used to query an identity and access management server (not shown) associated with an enterprise for whether a particular user has permission to access the authenticator app and/or any other enterprise-level source service applications to ensure that the user can use the MFA workflow management service to enroll a TOTP secret key for a source service account and/or request a TOTP passcode to access a source service account.

Figure 4:
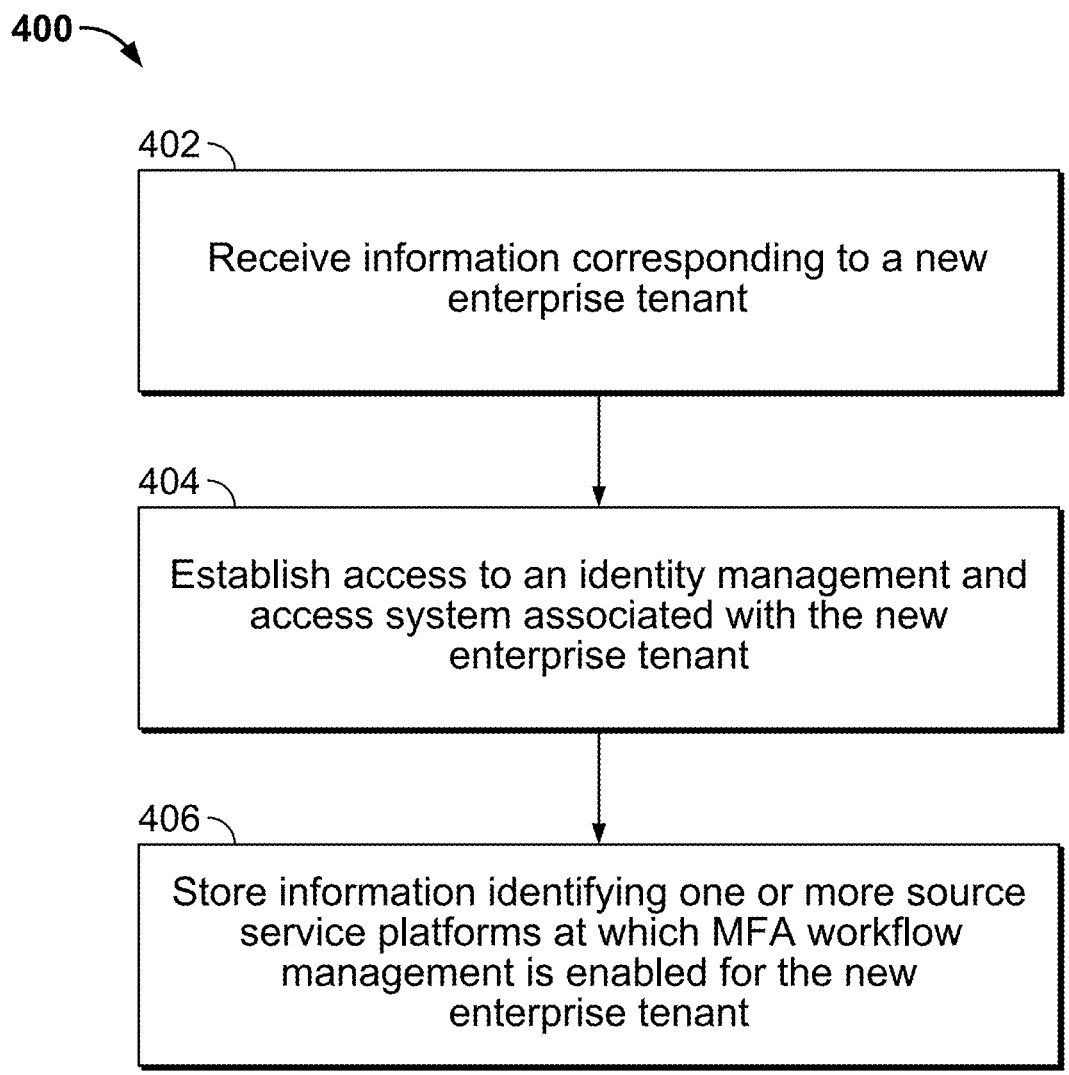
FIG. 4 is a flow diagram showing an example of a process for onboarding a new enterprise tenant at an MFA workflow management server in accordance with some embodiments.

FIG. 4 is a flow diagram showing an example of a process for onboarding a new enterprise tenant at an MFA workflow management server in accordance with some embodiments. In some embodiments, process 400 is implemented at MFA workflow management server 206 of FIG. 2.

Process 400 is an example process for onboarding a new enterprise with an MFA workflow management service, including to set up when the service should be used to provide access to TOTP secret keys to source service accounts for users (e.g., employees) of the enterprise.

At 402, information corresponding to a new enterprise tenant is received. For example, information related to the new enterprise tenant includes one or more of the following: an enterprise identifier and the identifier(s) of administrator users (who have permission to set up enterprise-level configurations at the MFA workflow management service).

At 404, access to an identity management and access system associated with the new enterprise tenant is established. This integration between the MFA workflow management server and the identity management and access system can be done using standard open identity connect (OIDC) which is built on top of open authentication (OAuth) 2.0 as documented in IETF RFC 6750.

At 406, information identifying one or more source service platforms at which MFA workflow management is enabled for the new enterprise tenant is stored. The new enterprise tenant may use several source services (e.g., that provide enterprise-level services) via the source service's mobile apps and/or web-based apps. The new enterprise tenant may have also enabled MFA with at least some of such services. Enabling MFA at a source service platform would cause the platform to require users to not only provide credentials (e.g., username and password) but also provide a time-sensitive TOTP passcode in order to access the service. Identifiers of one or more such source services for which the new enterprise tenant desires for the MFA workflow management service to manage the access to the TOTP passcodes are provided to the MFA workflow management service.

By enabling the MFA workflow management service to manage the MFA workflow for a particular source service, when a user of the enterprise tenant requests access to an MFA-protected account of that source service, whether the user is able to receive the relevant TOTP passcode to that account will be determined by the MFA workflow management service as a function of the identifier of the user and the user's relationship to the enterprise, whether the TOTP secret key associated with the account is accessible to that user, and/or the parameters of the security policy in which the TOTP secret key associated with the account is enrolled, as described herein.

Figure 5:
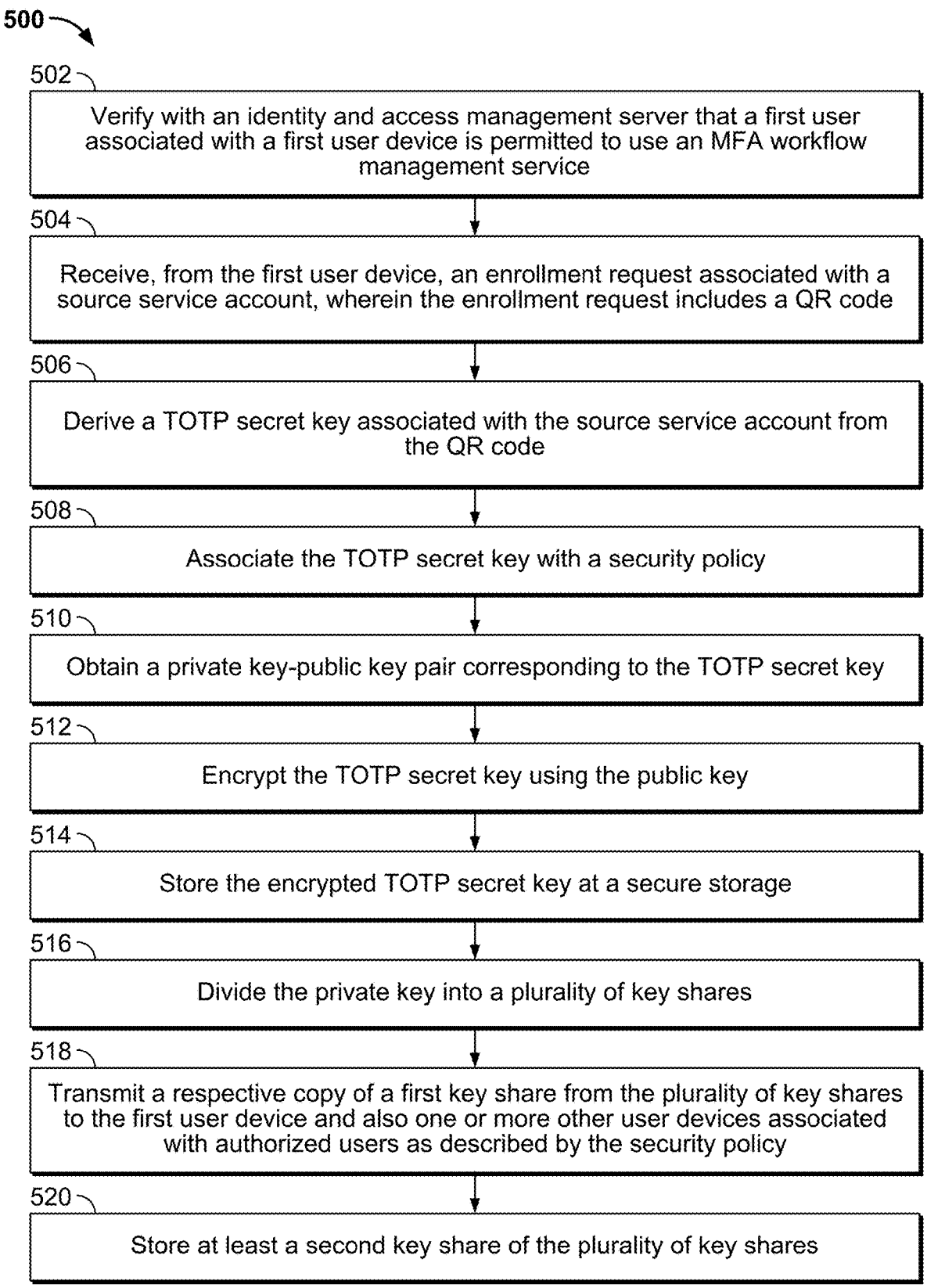
FIG. 5 is a flow diagram showing an example of a process for enrolling a source service account with a security policy maintained by an MFA workflow management server in accordance with some embodiments.

FIG. 5 is a flow diagram showing an example of a process for enrolling a source service account with a security policy maintained by an MFA workflow management server in accordance with some embodiments. In some embodiments, process 500 is implemented at MFA workflow management server 206 of FIG. 2.

Process 500 is an example process for enrolling a TOTP secret key that is associated with a source service account with a security policy that is maintained by the MFA workflow management server.

At 502, that a first user associated with a first user device is permitted to use an MFA workflow management service is verified with an identity and access management server. For example, when a user signs into the MFA workflow management authenticator app on their (e.g., mobile) device with their enterprise credentials (e.g., enterprise associated with single sign-on username and password), the identity and access management server (e.g., Okta® or Microsoft Azure Active Directory®) is queried to verify that the user with the provided enterprise credentials is currently associated with an enterprise tenant. Because the identity and access management server provides a framework/directory for which users associated with an enterprise should be able to access which enterprise-level service, in various embodiments, the identity and access management service controls access to the authenticator app of the MFA workflow management service on behalf of the enterprise tenant. In particular, the identity and access management server can verify whether the identity of the particular enterprise user associated with the provided credentials should be able to use the MFA workflow management service. As such, the identity and access management server can confirm that a user whose identity is associated with the provided credentials is in fact permitted to use the authenticator app associated with the MFA workflow management service to enroll TOTP secret keys associated with source service accounts.

One advantage of leveraging the identity and access management service to control access to the MFA workflow management service for enterprise users is that if an enterprise user's (e.g., employment) relationship with the enterprise changes (e.g., the employee departs the enterprise), then the identity and access management service can deny that user access to the authenticator app associated with the MFA workflow management service, which will have the follow-on effect of preventing that user from completing the MFA processes associated with enterprise-level source services that the user should also no longer have access to (e.g., as a result of no longer being employed by the enterprise).

At 504, an enrollment request associated with a source service account is received from the first user device, wherein the enrollment request includes a QR code. The first user (the user that is performing the enrollment of the account with the MFA workflow management service) signs into/creates a new account with a source service (e.g., an enterprise-level application) for which MFA is enabled. The new account is created with a corresponding set of credentials (e.g., username and password). To enroll the account into MFA, a server associated with the source service generates a QR code. The QR code is a convenient means for mobile devices to ingest (e.g., via a camera or other sensor) a secret cryptographic key in a text format as outlined in RFC 6238. For example, the QR code can encode at least a TOTP secret key that is issued by the source service platform and an identifier of the source service platform. In some embodiments, in addition to encoding the TOTP secret key, the QR code also includes other metadata (e.g., information related to the issuer and/or an expiration time).

In some embodiments, if more than a predetermined length of time has elapsed since the user was verified with the identity and access management server at step 502, step 502 is performed again to confirm that the user is still permitted to use the MFA workflow management service before proceeding.

At 506, a TOTP secret key associated with the source service account is derived from the QR code. The QR code is interpreted to derive at least the TOTP secret key issued by the source service platform for the new account. In some embodiments, the other metadata that is included in the QR code is also stored.

At 508, the TOTP secret key is associated with a security policy. The TOTP secret key is enrolled in a security policy. As mentioned above, a security policy may include: an enterprise identifier, a source service identifier, a source service account identifier, an account access mode, identifiers of authorized users of the account, and identifiers of approver users of the account, if applicable, given the indicated access mode. In one example, the security policy can be configured, at least in part, by the enrolling of the user during the enrollment process. For example, the authenticator app can provide a series of user interfaces that enable the user to input information such as the access mode for the account, the identifiers of authorized users to the account, and the identifiers of approver users to grant a requesting authorized user access to the account, if appropriate. In another example, the security policy can be configured (e.g., by an administrator user associated with the enterprise) in advance of the enrollment process and then a previously configured security policy can be selected by the enrolling user to enroll the TOTP secret key into.

In some embodiments, the security policy associated with a TOTP secret key can be dynamically/flexibly modified over time/as needed to change the accessibility to the TOTP secret key. In a first example, the security policy can be changed between "single user access" and "multiple user access," depending on whether the source service account is to be shared among potentially multiple users or not. In a second example, where the security policy specifies "multiple user access," the membership of authorized users can be updated to add new authorized users or remove existing authorized users. In the event that a new authorized user is added to the security policy, a copy of the key share is distributed to and stored within the secure enclave of a device associated with the newly authorized user. For example, if the source service account needs to be shared with an additional enterprise employee, then that user can be added to the list of authorized users in the policy. Also, if the access mode should be changed to add the additional layer of approval/oversight that is provided by "an approval threshold," the access mode can be updated accordingly in the policy.

A mapping among the TOTP secret key, the source service account identifier, and the corresponding security policy to which the secret key has been enrolled is stored.

At 510, a private key-public key pair corresponding to the TOTP secret key is obtained. A private key-public key pair associated with public-key cryptography is generated by an HSM.

At 512, the TOTP secret key is encrypted using the public key.

At 514, the encrypted TOTP secret key is stored at a secure storage.

At 516, the private key is divided into a plurality of key shares. In some embodiments, the private key of the pair is run through a key sharing cryptographic scheme such as MPC technique to generate three key shares. In some embodiments, the sharding technique that is used to split the private key into three key shares is a "two of three" scheme in which any two of the key shares can be used to recover the private key, which can then be used to decrypt the TOTP secret key that was previously encrypted using the public key of the same pair.

At 518, a respective copy of a first key share from the plurality of key shares is transmitted to the first user device and also one or more other user devices associated with authorized users as described by the security policy. Copies of one key of the key shares of the private key is sent to the device of each authorized user that is specified in the security policy. In the event that the security policy indicated an access mode of a "single user access," then the only authorized user may be the enrolling user. But in the event that the security policy indicated an access mode of "multiple user access," then the authorized users may include the enrolling user as well as at least one other user. The copy of this key share that is received at the device of each authorized user is then stored by the authenticator app at the device's respective secure enclave.

At 520, at least a second key share of the plurality of key shares is stored. In some embodiments, a second key share is stored in an HSM-backed cloud storage, which is accessible in real-time in response to requests to access a TOTP passcode associated with the account. In some embodiments, a third and last key share is stored in a semi-offline HSM-backed cloud storage as a backup in case one of the other two key shares becomes inaccessible.

After enrollment process 500 is completed for the source service account, authorized users as described in the security policy can later access the source service account by requesting, from the MFA workflow management service, a TOTP passcode that is derived from the source service account's TOTP secret key, which is protected by encryption and securely stored by the MFA workflow management server.

Figure 6:
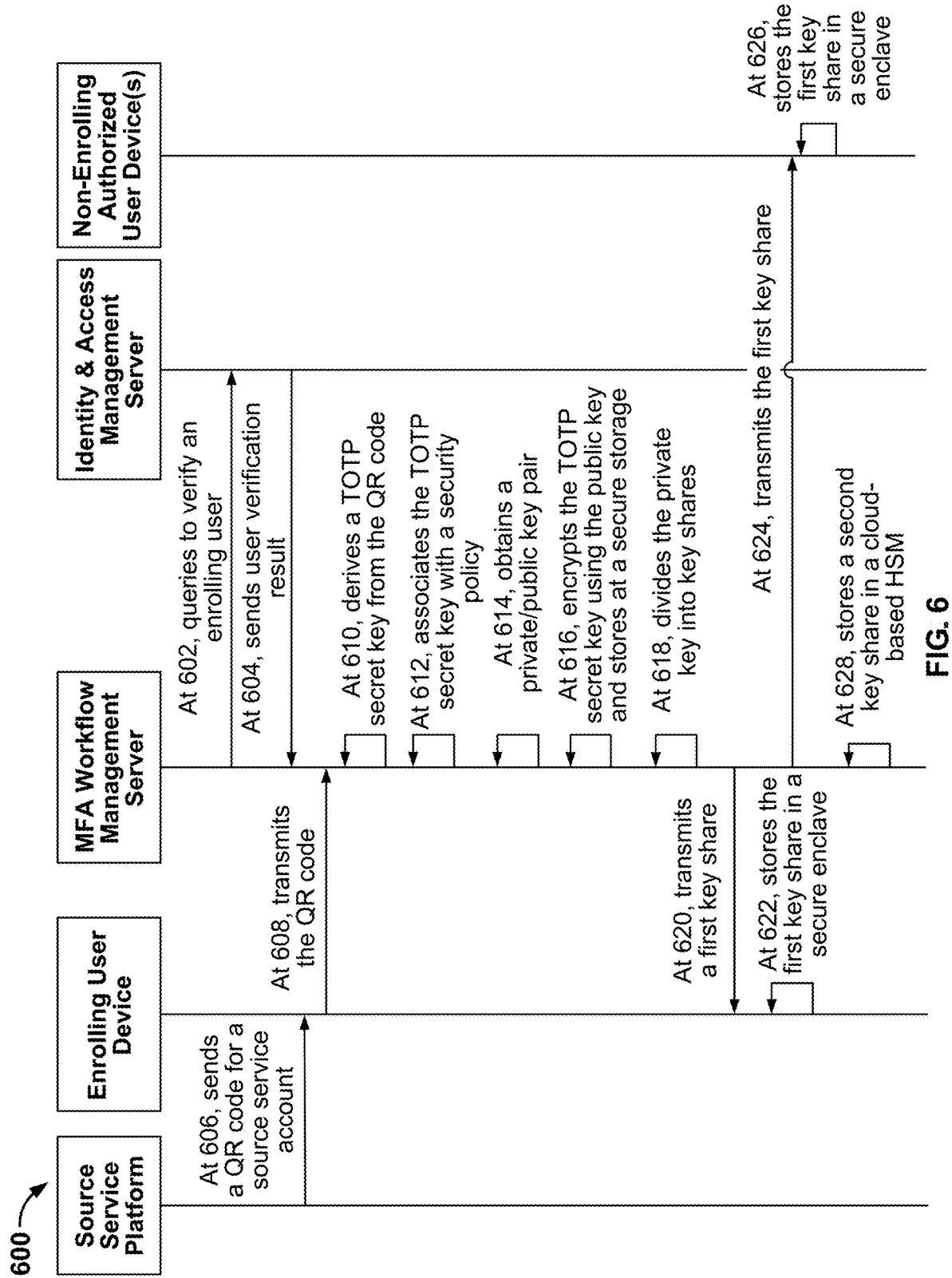
FIG. 6 is a sequence diagram showing an example of a process for enrolling a source service account with a security policy maintained by an MFA workflow management server in accordance with some embodiments.

FIG. 6 is a sequence diagram showing an example of a process for enrolling a source service account with a security policy maintained by an MFA workflow management server in accordance with some embodiments. Process 600 that is shown in FIG. 6 is similar to process 500 that is described in FIG. 5, only that process 600 illustrates the different components involved in the process. The components shown in FIG. 6 include a source service platform, an enrolling user device, an MFA workflow management server, an identity and access management server, and non-enrolling, authorized user device(s).

At 602, the MFA workflow management server queries the identity and access management server to verify that an enrolling user is permitted to access the MFA workflow management service. For example, the MFA workflow management server can query the identity and access management server in response to receiving the enrolling user's credentials into an authenticator app associated with the MFA workflow management server.

At 604, the identify and access management server sends the user verification result to the MFA workflow management server. Based on the identity of the user as determined from the credentials, the identify and access management server can determine a user verification result of whether that user is permitted to use the authenticator app associated with the MFA workflow management service to enroll the TOTP secret key of a source service account.

In some embodiments, if more than a predetermined length of time has elapsed since the user was verified with the identity and access management server at steps 602 and 604, steps 602 and 604 are performed again to confirm that the user is still permitted to use the MFA workflow management service before proceeding.

At 606, a source service platform sends a QR code for a source service account to the enrolling user device. For example, the source service platform sends a QR code for a source service account in response to the source service account being newly created or the enabling of MFA (for the first time) for the source service account.

At 608, the enrolling user device transmits the QR code to the MFA workflow management server. For example, the enrolling user device can capture an image/photo of the QR code that is presented at a source service application.

At 610, the MFA workflow management server derives a TOTP secret key from the QR code.

At 612, the MFA workflow management server associates the TOTP secret key with a security policy. As mentioned above, the security policy may be configured by the enrolling user or the security policy may have been created prior to the enrollment process and was selected to be associated with the TOTP secret key during the enrollment process. In some embodiments, the security policy is created, at least in part, in real-time by the enrolling user during the enrollment process.

At 614, the MFA workflow management server obtains a private key-public key pair. In some embodiments, the private key-public key pair for the account/TOTP secret key is generated by an HSM.

At 616, the MFA workflow management server encrypts a TOTP secret key using the public key and stores the encrypted TOTP secret key at a secure storage.

At 618, the MFA workflow management server divides the private key into key shares. In some embodiments, the private key of the pair is split into at least two key shares using a key sharing cryptographic scheme such as MPC technique. The key shares are divided using a standard quorum-based cryptographic technique such that some subset of shares of a total number equal to or greater than that subset can be used to recover the private key.

At 620, the MFA workflow management server transmits a first key share to the enrolling user device. In the example of FIG. 6, it is assumed that the security policy specifies an access mode associated with "multiple user access" and so copies of the first key share are sent to not only the device of the enrolling user, who is an authorized user, but also the devices of one or more other authorized users who did not initiate the enrollment process.

Put another way, a source service account only needs to be enrolled once into the MFA workflow management service by one authorized user and thereafter, any authorized users of the account (even user(s) other than the user that had enrolled the account into the MFA workflow management service) can request a TOTP passcode associated with that account from the MFA workflow management server.

At 622, the enrolling user device stores the first key share in a secure enclave. The copy of the first key share that is received at the enrolling user device is stored by the authenticator app within the device's secure enclave.

At 624, the MFA workflow management server transmits the first key share to each non-enrolling, authorized user device.

At 626, each non-enrolling user device stores the first key share in a secure enclave. The copy of the first key share that is received at the user device of each other authorized user is stored by the authenticator app within the device's respective secure enclave.

At 628, the MFA workflow management server stores a second key share in a cloud-based HSM. The second key share is stored at a cloud-based HSM and the third key share is stored at a semi-offline HSM for the purpose of backup.

Figure 7:
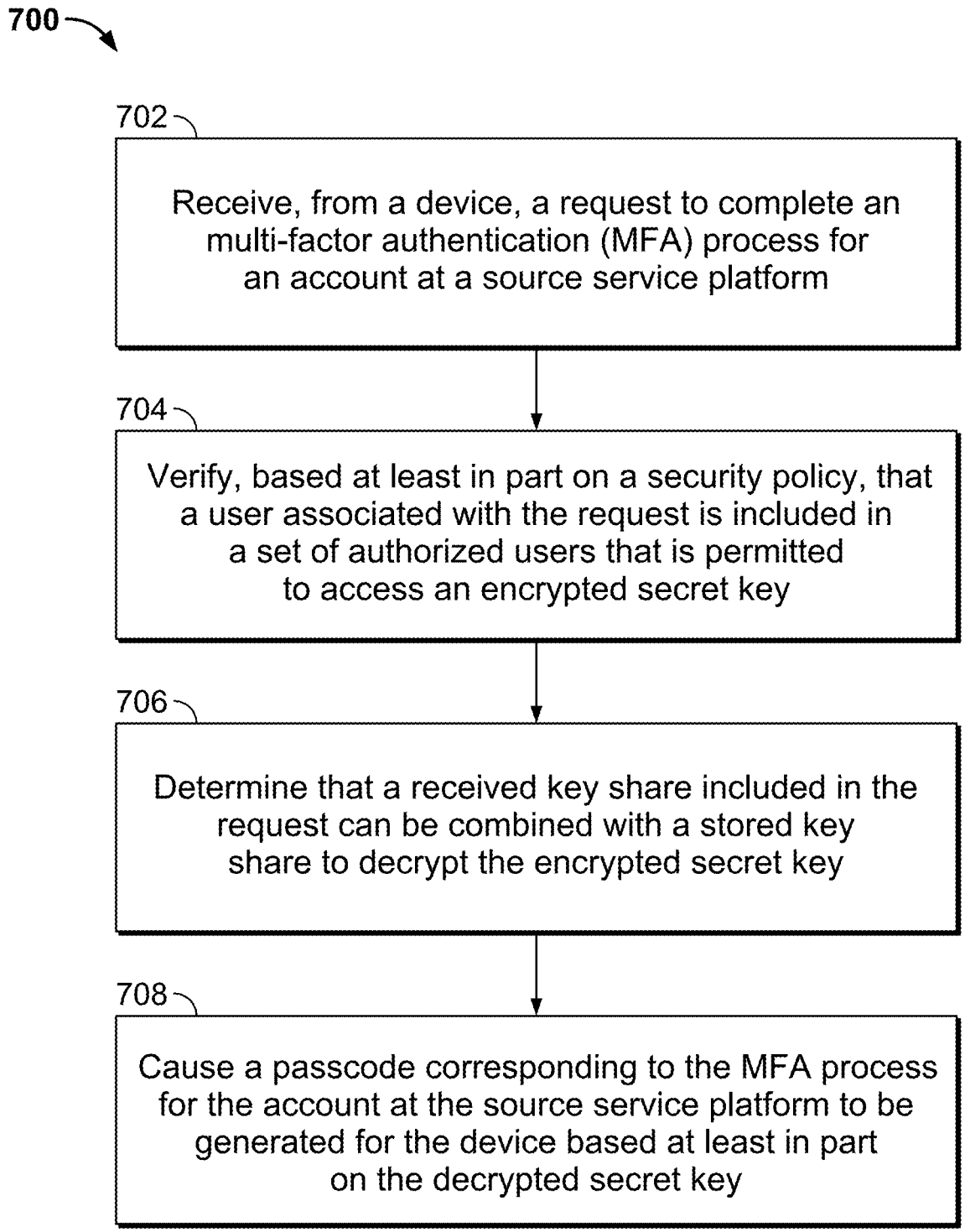
FIG. 7 is a flow diagram showing an embodiment of a process for managing an MFA workflow.

FIG. 7 is a flow diagram showing an embodiment of a process for managing an MFA workflow. In some embodiments, process 700 is implemented at MFA workflow management server 206 of FIG. 2.

At 702, a request to complete a multi-factor authentication process for an account at a source service platform is received. For example, an enterprise-level source service application that is attempted to be accessed by an enterprise user using a laptop or a desktop computer has MFA enabled. As such, after the enterprise user inputs their credentials for the desired account with the source service application, the source service application prompts the user to enter a time-sensitive passcode (e.g., a TOTP passcode) to complete the MFA process. Given that the TOTP secret key corresponding to the source service account has previously been enrolled in a security policy at the MFA workflow management server (e.g., using a process such as process 500 of FIG. 5 or process 600 of FIG. 6), the user then opens the authenticator app associated with the MFA workflow management service to request this TOTP passcode for this account. For example, the authenticator app may be executing on a different device than the device at which the user is using to access the account at the source service application. In a specific example, the user may be attempting to access the account at the source service application using a laptop or desktop computer but using a separate, mobile device to request the TOTP passcode from the authenticator app.

If the authenticator app is executing at a device that is associated with an authorized user (as specified in the enrolled security policy), then the device should have previously received in the enrollment process (e.g., a process such as process 500 of FIG. 5 or process 600 of FIG. 6) a key share that was derived from a private key that was generated corresponding to the TOTP secret key associated with the present source service account. The authenticator app should have stored this key share in the device's secure enclave.

At 704, that a user associated with the request is included in a set of authorized users that is permitted to access an encrypted secret key is verified based at least in part on a security policy. The request that is sent from the authenticator app may include one or more of the following: a user identifier, a source service account identifier, and the key share that was stored at the device's secure enclave. For example, the key share that was stored at the device's secure enclave is accessible to the authenticator app. For example, the relevant security policy to the source service account may be obtained by comparing the source service account identifier included in the request to stored mappings between sourced service identifiers and security policies. The user associated with the request is verified to be one of potentially multiple authorized users by comparing the user identifier included in the request to the authorized user(s) described in the relevant security policy.

In the event that the relevant security policy specifies an access mode that requires an approval threshold, then the approver users that are described in the security policy are prompted for their approvals. As will be described in further detail below, if the number/proportions of approvals that are received meet the set of approval criteria that is described in the security policy, then the encrypted secret key is proceeded to be decrypted to ultimately generate the requested passcode to complete the MFA process at the source service platform.

At 706, that a received key share included in the request can be combined with a stored key share to decrypt the encrypted secret key is determined. After the user associated with the request is verified to be an authorized user as described in the security policy, the key share that is included in the request is cryptographically combined with a stored key share (e.g., which was obtained from a cloud-based HSM from a trusted execution environment) corresponding to that source service account to recover the private key (because the two of three access models was used to divide the private key into multiple key shares). Cryptographically combining the key share from the request with the stored key share involves using a key sharing cryptographic scheme such as MPC, for example, to reconstitute the private key. The encrypted TOTP secret key that corresponds to the source service account is obtained from a cloud-based secure storage. Previously, during the enrollment process (e.g., a process such as process 500 of FIG. 5 or process 600 of FIG. 6), the TOTP secret key corresponding to the source service account was encrypted using the public key of a public key-private key pair that was generated/obtained by an HSM for the account. Now, during the MFA process as described in process 700, the recovered private key is used to decrypt the encrypted TOTP secret key.

At 708, a passcode corresponding to the MFA process for the account at the source service platform is caused to be generated for the device based at least in part on the decrypted secret key. The decrypted TOTP secret key is used along with the current time and/or other metadata associated with the QR code derived from the TOTP secret key to generate the (e.g., six-digit) TOTP passcode that is presented within the authenticator app. The TOTP passcode can then be entered/copied by the user into the source service application to complete the MFA process with the source service platform. Once the source service platform confirms that the received TOTP passcode matches the TOTP passcode that it had generated for the account, the platform will grant the user access to the source service account. In some embodiments, the TOTP passcode is generated by the MFA workflow management server and then sent to the device at which the authenticator app is running. In some embodiments, the MFA workflow management server can generate N number of TOTP passcodes based on the decrypted TOTP secret key and several points in time within a given window (which includes the current time and a time duration in the future) so that the N TOTP passcodes can be (e.g., temporarily) cached at the device and as time-appropriate, presented within the authenticator app as the user requests additional TOTP passcodes within that time window without requiring the authenticator app to make a request (over a network) to the remote MFA workflow management server within that given time window. For example, if N=3, then three TOTP passcodes will be generated where the first TOTP passcode is generated as a function of [decrypted TOTP secret key+current time], the second TOTP passcode is generated as a function of [decrypted TOTP secret key+first future time], and the third TOTP passcode is generated as a function of [decrypted TOTP secret key+second future time]. For example, N is an arbitrary number that is configurable by the enterprise organization. For example, an enterprise may allow for N=5, 10, or 15 cached TOTP passcodes. So, in thinking about that over a timeline of 30 seconds per TOTP passcode rotation, N=5 would allow for a valid window of 2.5 minutes, N=10 would allow for a valid window of 5 minutes, etc. worth of TOTP passcodes cached on the device. Once the cached time window is expired, a request for the TOTP secret key would be required to be sent from the device to the MFA workflow management server (over a network).

In some other embodiments, the decrypted TOTP secret key is sent from the MFA workflow management server to the authenticator app running at the device and the TOTP passcode is generated locally at the device and then presented within the authenticator app. Where the decrypted TOTP secret key is sent to the authenticator app running at the device, the authenticator app ensures that after generating the requested TOTP passcode(s), the TOTP secret key is purged from local memory/storage of the application, making it no longer accessible. When the user next initiates a request for a TOTP passcode (e.g., beyond the cached time window), a new request is issued by the authenticator app to the MFA workflow management server.

Figure 8:
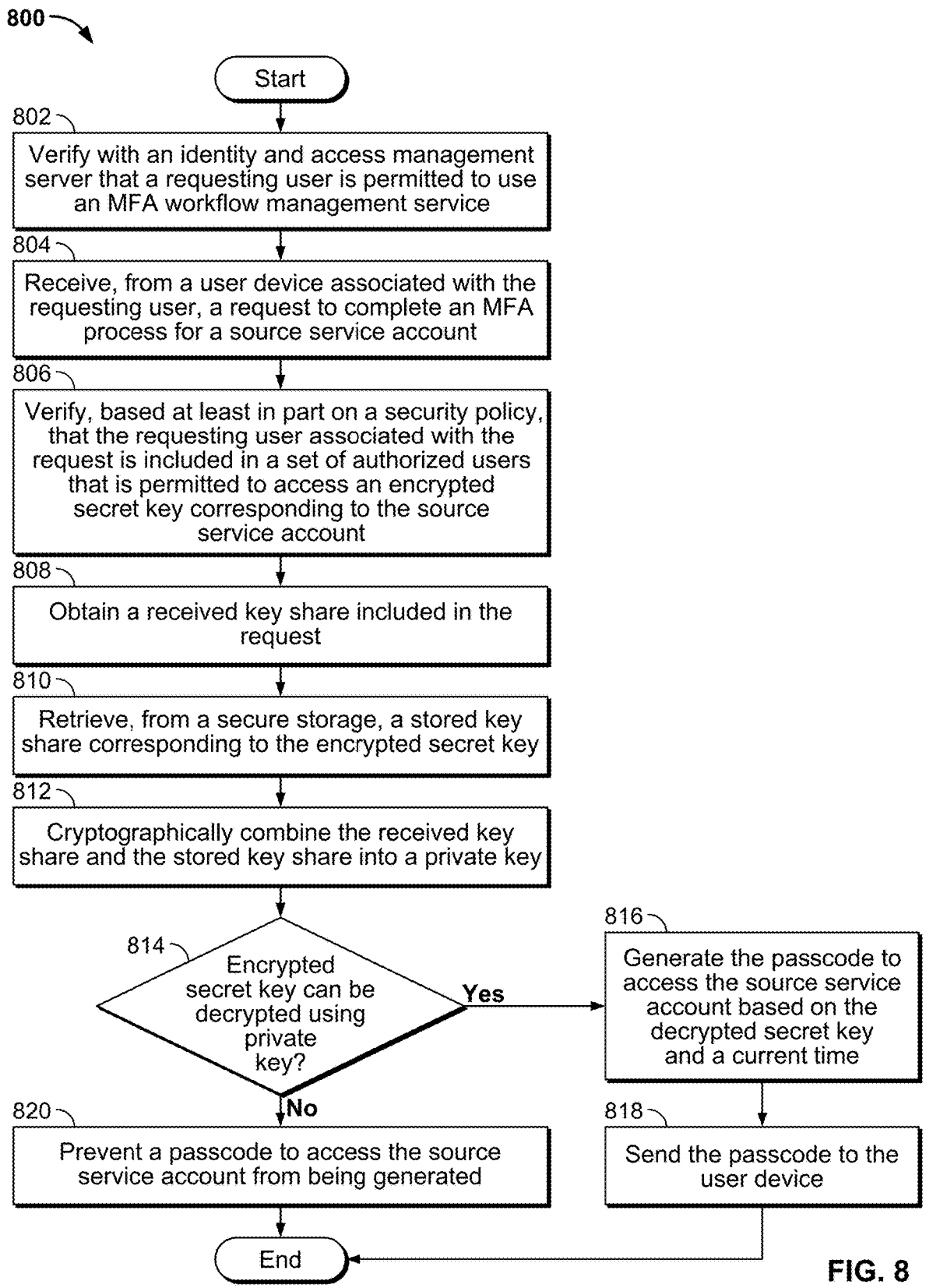
FIG. 8 is a flow diagram showing an example of a process for managing an MFA workflow without using an approval threshold in accordance with some embodiments.

FIG. 8 is a flow diagram showing an example of a process for managing an MFA workflow without using an approval threshold in accordance with some embodiments. In some embodiments, process 800 is implemented at MFA workflow management server 206 of FIG. 2. In some embodiments, process 700 of FIG. 7 may be implemented, at least in part, using process 800.

Process 800 is an example process for managing an MFA workflow when the relevant access mode (as described in the relevant security policy) enables either "single user access" or "multiple user access" to a source service account but does not require an "approval threshold." In process 800, it is assumed that the source service platform issued TOTP secret key for the account was previously enrolled in the MFA workflow management security policy using an enrollment process (e.g., a process such as process 500 of FIG. 5 or process 600 of FIG. 6).

At 802, that a requesting user is permitted to use an MFA workflow management service is verified with an identity and access management server. For example, the credentials that the enterprise user had input into an authenticator app is used by the MFA workflow management to query an identity and access management server to confirm that the enterprise user is still permitted according to the enterprise-level access controls to have permission to access the enterprise application of MFA workflow management service, which in turn provides access control to the TOTP passcodes needed to complete the MFA process for other enterprise-level services.

At 804, a request to complete an MFA process for a source service account is received from a user device associated with the requesting user. For example, to request to complete an MFA process (e.g., a request for the MFA related passcode) for a source service account, the user can open the authenticator app and make a selection related to that source service account. The request that is sent from the authenticator app to the MFA workflow management server may include one or more of the following: a user identifier, a source service account identifier, and the key share that was stored at the device's secure enclave.

In some embodiments, before the authenticator app at the user device issues the request to the MFA workflow management server, the authenticator app first checks whether there is a previously cached TOTP passcode for the account that can be used to complete the MFA process at the source service platform at the current time. As mentioned above, in some embodiments, N TOTP passcodes corresponding to a given window of time can be generated for a source service account in response to one access request and then cached at the device to anticipate a potential offline scenario and/or to reduce the number of TOTP passcode requests that need to be handled at the MFA workflow management server. Only if no such previously cached TOTP passcode is valid for the current time does the authenticator app issue the request to the MFA workflow management server At 806, that the requesting user associated with the request is included in a set of authorized users that is permitted to access an encrypted secret key corresponding to the source service account is verified based at least in part on a security policy. The security policy that corresponds to the source service identifier of the request is obtained from storage and the user identifier of the request is confirmed to match an authorized user as described in the policy.

At 808, a received key share included in the request is obtained.

At 810, a stored key share corresponding to the encrypted secret key is retrieved from a secure storage. Another key share related to the same source service account as the private key is obtained from a secure (e.g., cloud-base HSM) storage.

At 812, the received key share and the stored key share are cryptographically combined into a private key. The key share from the request is cryptographically combined with the stored key share to recover the private key using the two of three access models.

At 814, whether an encrypted secret key can be decrypted using the private key is determined. In the event that the encrypted secret key can be decrypted using the private key, control is transferred to 816. Otherwise, in the event that the encrypted secret key cannot be decrypted using the private key, control is transferred to 820. The encrypted TOTP secret key that is stored in a cloud-based secure storage (which is separate from the storage at which the key share was stored) is obtained. Given that the TOTP secret key was previously encrypted using the public key of a public key-private key pair, the encrypted TOTP secret key can be decrypted using the private key from the same pair.

At 816, the passcode to access the source service account is generated based on the decrypted secret key and a current time. If the private key that was recovered at step 812 was from the public key-private key pair from which the public key was used to encrypt the TOTP secret key, then the encrypted TOTP secret key can be successfully decrypted at step 814 by that private key and so the TOTP passcode should be able to be generated from the decrypted TOTP secret key. In some embodiments, the MFA workflow management server can generate N number of TOTP passcodes based on the decrypted TOTP secret key and several points in time within a given time window (which includes the current time and a time duration in the future).

At 818, the passcode is sent to the user device. In some embodiments, up to N TOTP passcodes are generated by the MFA workflow management server using the decrypted TOTP secret key and then sent to the device to be cached.

At 820, a passcode to access the source service account is prevented from being generated. But if the private key that was recovered at step 812 was not from the public key-private key pair from which the public key was used to encrypt the TOTP secret key, then the encrypted TOTP secret key cannot be successfully decrypted at step 814 by that private key and so the TOTP passcode should not be able to be generated from the decrypted TOTP secret key.

Figure 9:
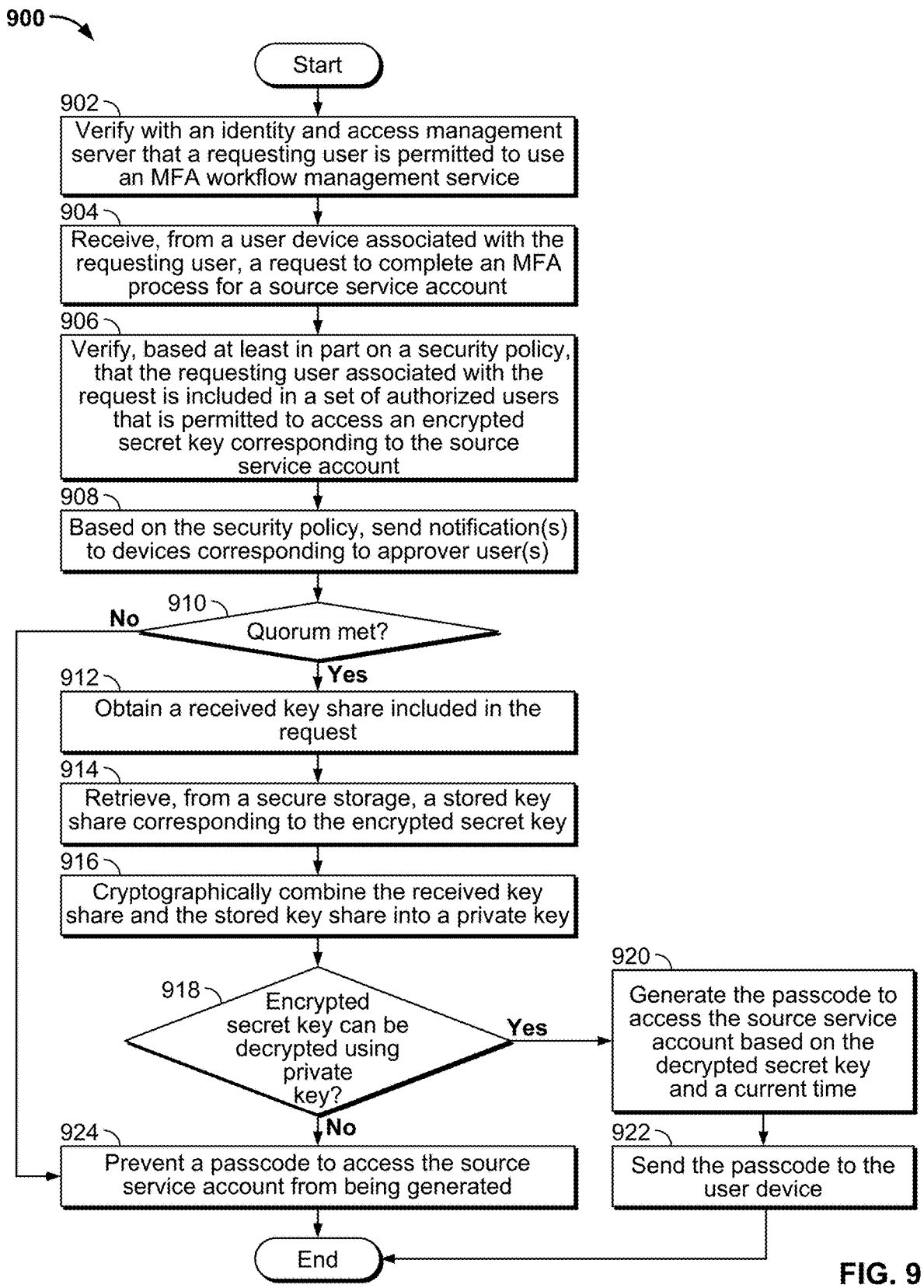
FIG. 9 is a flow diagram showing an example of a process for managing an MFA workflow using an approval threshold in accordance with some embodiments.

FIG. 9 is a flow diagram showing an example of a process for managing an MFA workflow using an approval threshold in accordance with some embodiments. In some embodiments, process 900 is implemented at MFA workflow management server 206 of FIG. 2. In some embodiments, process 700 of FIG. 7 may be implemented, at least in part, using process 900.

Process 900 is an example process for managing an MFA workflow when the relevant access mode (as described in the relevant security policy) enables either "single user access" or "multiple user access" to a source service account and does not require an "approval threshold." As will be described below, process 900 is similar to process 800 of FIG. 8 except with the additional requirement of seeking out sufficient approvals from approver users before proceeding to generate the requested TOTP passcode. In process 900, it is assumed that the source service platform issued TOTP secret key for the account was previously enrolled in an MFA workflow management security policy using an enrollment process (e.g., a process such as process 500 of FIG. 5 or process 600 of FIG. 6).

At 902, that a requesting user is permitted to use an MFA workflow management service is verified with an identity and access management server. Step 902 can be performed similarly to step 802 of process 800 of FIG. 8.

At 904, a request to complete an MFA process for a source service account is received from a user device associated with the requesting user. Step 904 can be performed similarly to step 804 of process 800 of FIG. 8.

At 906, that the requesting user associated with the request is included in a set of authorized users that is permitted to access an encrypted secret key corresponding to the source service account is verified based at least in part on a security policy. Step 906 can be performed similarly to step 806 of process 800 of FIG. 8.

At 908, notification(s) are sent to devices of approver users based on the security policy. In the example of FIG. 9, the security policy in which the source service account has been enrolled includes an access mode that requires an "approval threshold," meaning that approval(s) must be received from a sufficient number/proportion of approver users as identified within the policy (e.g., within a given time interval) in order for the TOTP secret key to be accessed. In various embodiments, in the event that the security policy includes an access mode that requires an "approval threshold," the policy also specifies the identifiers of one or more approver users as well as a set of approval criteria. For example, the approver users may include enterprise users in roles that might provide oversight to the access of certain enterprise-level applications. The set of approval criteria describes condition(s) that indicate when a quorum/threshold (enough amount) of approving approver users is met to warrant the access to the TOTP secret key. For example, the set of approval criteria may prescribe that a quorum is achieved when at least two approver users have approved of the request within a prescribed period of time. In another example, the set of approval criteria may prescribe that a quorum is achieved when over 50% of approver users have approved of the request within a prescribed period of time.

When the access mode in the security policy includes "an approval threshold," a notification or prompt for approval is sent to each approver user (as identified in the security policy) over one or more channels. Example channels include each approver user's authenticator app, email, text message, or messaging app. The notification or prompt may include the identifier of the user that is requesting the TOTP passcode to complete the MFA process for a source service account, the identifier of the source service account, and/or a time by which the approver user must submit an approval for the approval to count towards the quorum. The number of approvals that are received from the notified approver users (e.g., over any channel) within the given time interval is compared to the set of approval criteria to determine whether the described quorum/threshold of approving users was met.

In some embodiments, when a security policy includes an access mode that requires an "approval threshold," the security policy may also include an effective time interval associated with the approval quorum having been met. The effective time interval may prescribe a period of time (e.g., 3 hours) following the approval quorum having been met in response to a previous access request such that if a subsequent access request, e.g., were received from the same authorized user during this effective time interval, approver users need not be prompted for approvals prior to generating the TOTP passcode. This effective time interval may relieve the MFA workflow management server from needing to send out and collect approvals from approver users in response to access requests that are received close in time.

At 910, whether a quorum of approvals is received is determined. In the event that a quorum of approvals is received, control is transferred to 912. Otherwise, in the event that a quorum of approvals is not received, control is transferred to 924. Only if the quorum/threshold is met is the TOTP secret key corresponding to the source service account accessed to generate the TOTP passcode. Otherwise, in the event that a quorum of approvals is not met, then the TOTP secret key corresponding to the source service account is not accessed and as a result, the TOTP passcode is not generated, which will result in the user not being able to complete the MFA process to access the source service account.

At 912, a received key share included in the request is obtained. Step 912 can be performed similarly to step 808 of process 800 of FIG. 8.

At 914, a stored key share corresponding to the encrypted secret key is retrieved from a secure storage. Step 914 can be performed similarly to step 810 of process 800 of FIG. 8.

At 916, the received key share and the stored key share are cryptographically combined into a private key. Step 916 can be performed similarly to step 812 of process 800 of FIG. 8.

At 918, whether an encrypted secret key can be decrypted using the private key is determined. In the event that the encrypted secret key can be decrypted using the private key, control is transferred to 920. Otherwise, in the event that the encrypted secret key cannot be decrypted using the private key, control is transferred to 924. Step 918 can be performed similarly to step 814 of process 800 of FIG. 8.

At 920, the passcode to access the source service account is generated based on the decrypted secret key and a current time. Step 920 can be performed similarly to step 816 of process 800 of FIG. 8.

At 922, the passcode is sent to the user device. Step 922 can be performed similarly to step 818 of process 800 of FIG. 8.

At 924, a passcode to access the source service account is prevented from being generated. Step 924 can be performed similarly to step 820 of process 800 of FIG. 8.

Figure 10:
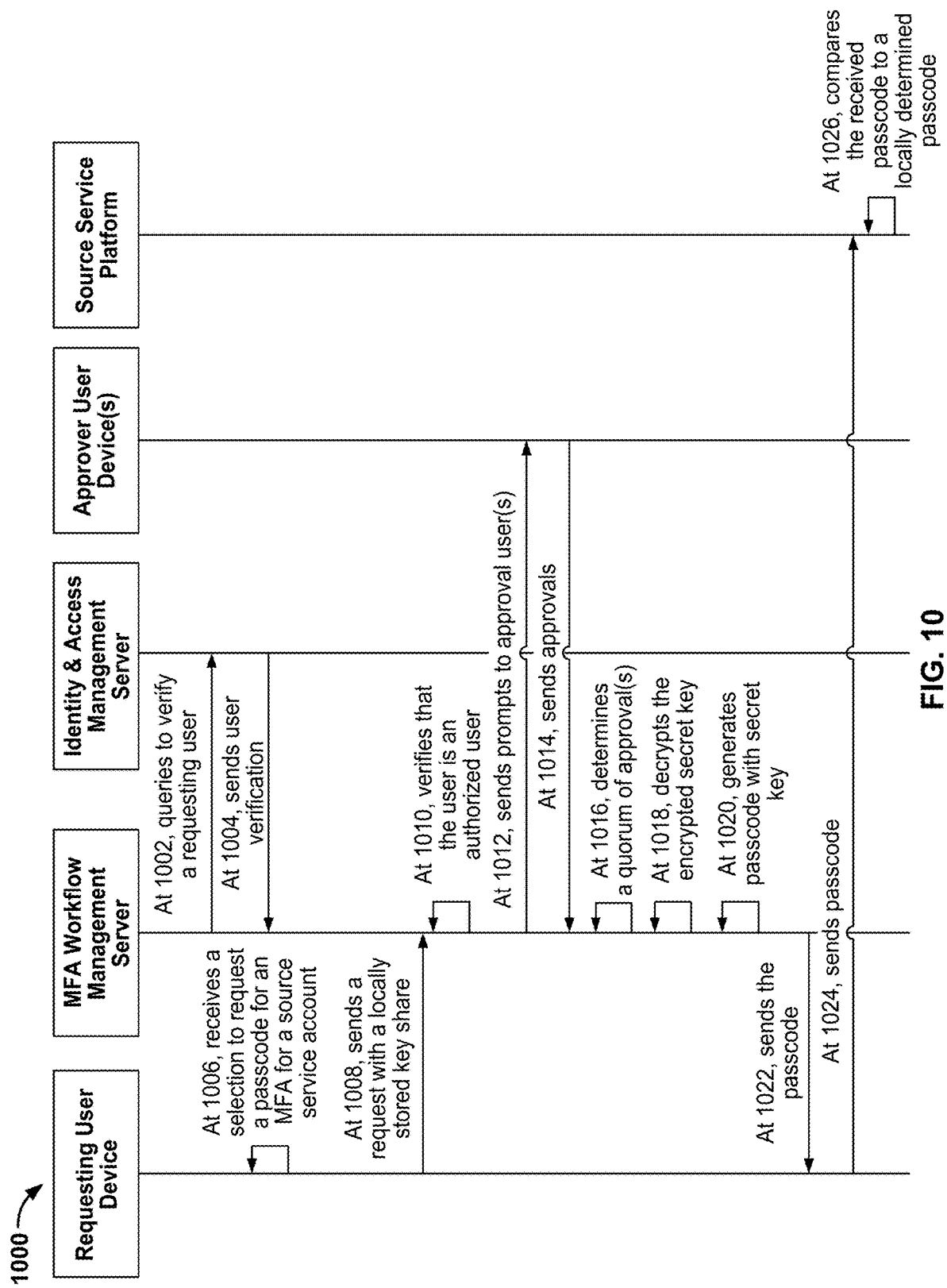
FIG. 10 is a sequence diagram showing an example of a process for managing an MFA workflow using an approval threshold in accordance with some embodiments.

FIG. 10 is a sequence diagram showing an example of a process for managing an MFA workflow using an approval threshold in accordance with some embodiments. Process 1000 that is shown in FIG. 10 is similar to process 900 that is described in FIG. 9, only that process 1000 illustrates the different components involved in the process. The components shown in FIG. 10 include a requesting user device, an MFA workflow management server, an identity and access management server, approver user device(s), and a source service platform.

At 1002, the MFA workflow management server queries the identity and access management server to verify a requesting user. For example, the MFA workflow management server can query the identity and access management server in response to receiving the enrolling user's credentials into an authenticator app associated with the MFA workflow management server.

At 1004, the identity and access management server sends a user verification to the MFA workflow management server. Based on the identity of the user as determined from the credentials, the identify and access management server can determine a user verification result of whether that user is permitted to use the authenticator app associated with the MFA workflow management service to request a TOTP passcode associated with a previous enrolled TOTP secret key of a source service account.

At 1006, the requesting user device receives a selection from the requesting user to request a passcode for an MFA for a source service account. For example, the enterprise user had already submitted their credentials for the source service account but due to MFA being enabled for that service, the enterprise must also complete an MFA process (e.g., by submitting an MFA related passcode) in order to access the account. To request this passcode, the user can open the authenticator app and make a selection related to that source service account.

At 1008, the requesting user device sends a request with a locally stored key share.

At 1010, the MFA workflow management server verifies that the user is an authorized user. The enterprise can be recognized as an authorized user by confirming that the user identifier included in the request matches that of an authorized user as described in the security policy that matches the source service account identifier that is included in the request.

At 1012, the MFA workflow management server sends prompts to approver user(s) to the approver user device(s). In the example of FIG. 10, the security policy includes an access mode with "an approval threshold" and so prompts are sent to the device(s) of one or more approver users that are also specified in the security policy.

At 1014, the approver user device(s) send approvals to the MFA workflow management server.

At 1016, the MFA workflow management server determines that a quorum of approval(s) is met. In the example of FIG. 10, the amount of approvals that are received from the approver users meet the quorum that is described by the set of approval criteria as described in the security policy.

At 1018, the MFA workflow management server decrypts the encrypted secret key. In response to the received approvals meeting the quorum that is described by the set of approval criteria as described in the security policy, the received key share included in the request is cryptographically combined with a (e.g., HSM) stored key share associated with the source service account to recover a private key. The encrypted TOTP secret key corresponding to the source service account is then decrypted using the recovered private key.

At 1020, the MFA workflow management server generates a passcode based on the secret key. In some embodiments, the MFA workflow management server can generate N number of TOTP passcodes based on the decrypted TOTP secret key and several points in time within a given window (which includes the current time and a time duration in the future).

At 1022, the MFA workflow management server sends the passcode to the requesting user device. The at least one TOTP passcode (but up to N TOTP passcodes) is sent to the requesting user device.

At 1024, the requesting user device sends the passcode to the source service platform. The requesting user device then sends the TOTP passcode corresponding to the current time to the source service platform.

At 1026, the source service platform compares the passcode to a locally determined passcode. The source service platform, which has access to a copy of the TOTP secret key, had generated a TOTP passcode corresponding to the current time based on the secret key. The source service platform will grant the enterprise user access to the source service account if the TOTP passcode that it had received from the user's device matches the one that it had locally computed.

FIG. 11 is a diagram showing an example of a security policy in accordance with some embodiments. In example security policy 1100, field "securityType": "3" refers to the access mode of "multiple user access with approval threshold." Fields "dateApplied": "2024 May 23" and "timeApplied": "19:50:47" respectively refer to the dates and times at which the security policy was applied for a particular source service account and the corresponding TOTP secret key. Fields "appliedBy": "john.doe" and "company": "acme" refer respectively to the (e.g., enrolling) enterprise user and the related enterprise that had enrolled the source service account and the corresponding TOTP secret key into security policy 1100. Field "quorumUserT": "2" and "quorumUserN": "3" refer to the requirement of needing 2 key shares out of 3 (in a 2 of 3 security access model) to recover the private key and therefore decrypt the encrypted TOTP secret key. Fields "quorumUserNMember1": "jack.smith@acme.com", "quorumUserNMember2": "bob.mallory@acme.com," "quorumUserNMember3": "alice.warner@acme.com", "quorumUserNMember4": "bill.riley@acme.com," and "quorumUserNMember5": "eve.jackson@acme.com" refer to the identifiers (email addresses) of the given authorized users of security policy 1100. Field "quorumApproverN": "5" refers to there being five approver users of the source service account that will be prompted for when an authorized user requests to receive a TOTP passcode to be generated from the TOTP secret key. Fields "quorumApproverNMember1": "jack.miller@acme.com", "quorumApproverNMember2": "bob.jones@acme.com," and "quorumApproverNMember3": "alice.perkins@acme.com" refer to the identifiers (email addresses) of the given approver users. Field "quorumApproverT": "2" refers to the approval threshold of needing approvals from at least 2 of the 5 approver users before allowing a TOTP passcode to be generated for the requestor.

As mentioned above, a stored security policy such as security policy 1100 can be modified over time, even after it has been applied to a source service account and the corresponding TOTP secret key. For example, the membership of authorized users can be updated to add additional authorized users or to remove existing authorized users. The membership of the approver users can also be updated to add additional approver users or to remove existing approver users. Such changes of memberships to the user roles described in the security policy may be prompted by, for example, new employees being hired at an enterprise, existing employees switching positions within the enterprise, and/or the employees departing the enterprise.

FIGS. 12, 13A, 13B, 13C, 13D, 13E, 13F, and 13G describe example user interfaces associated with the process of enrolling an account at an enterprise service platform with the MFA workflow management service in accordance with some embodiments.

Figure 12:
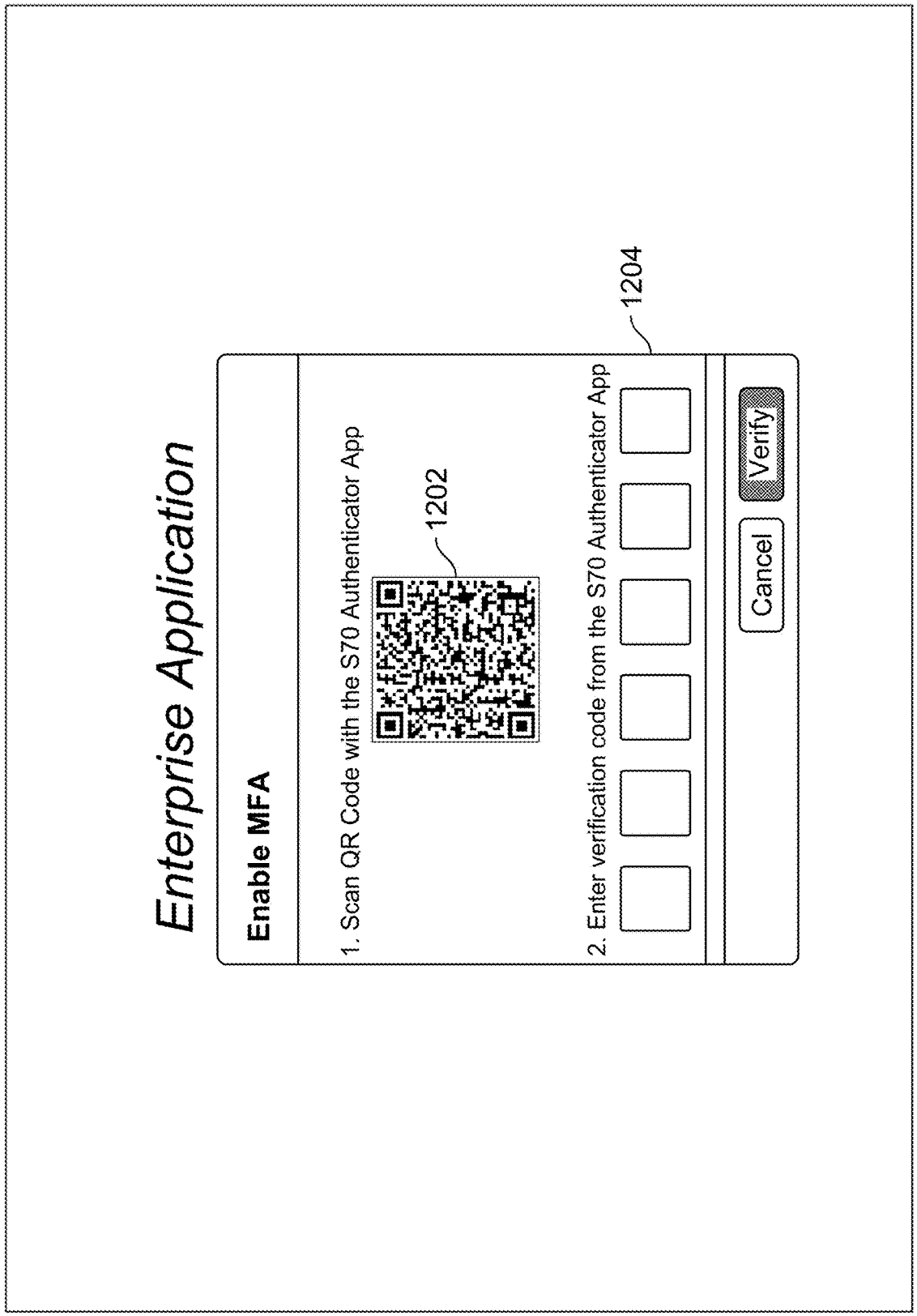
FIG. 12 shows an example user interface that is provided by an enterprise application that is provided by an enterprise service platform (a source service platform) to a user that is enabling the MFA process for an account with the platform.

FIG. 12 shows an example user interface that is provided by an enterprise application that is provided by an enterprise service platform (a source service platform) to a user that is enabling the MFA process for an account with the platform. In FIG. 12, the user is an enterprise user who has already created an account or is creating a new account at the platform that is providing enterprise-level services. Section 1202 shows a QR code that is issued by the platform for the account and the QR code encodes at least the TOTP secret key corresponding to the account and other metadata. Section 1204 prompts for a verification code that comprises a TOTP passcode corresponding to the current time and the TOTP secret key that is encoded by the QR code in section 1202. As will be described in further detail below, after the QR code is ingested by the MFA workflow management server, a TOTP passcode is generated based on the current time and then provided as the verification code to be entered in section 1204 of the enterprise application, to complete the MFA enabling process at the enterprise service platform.

Figure 13B:
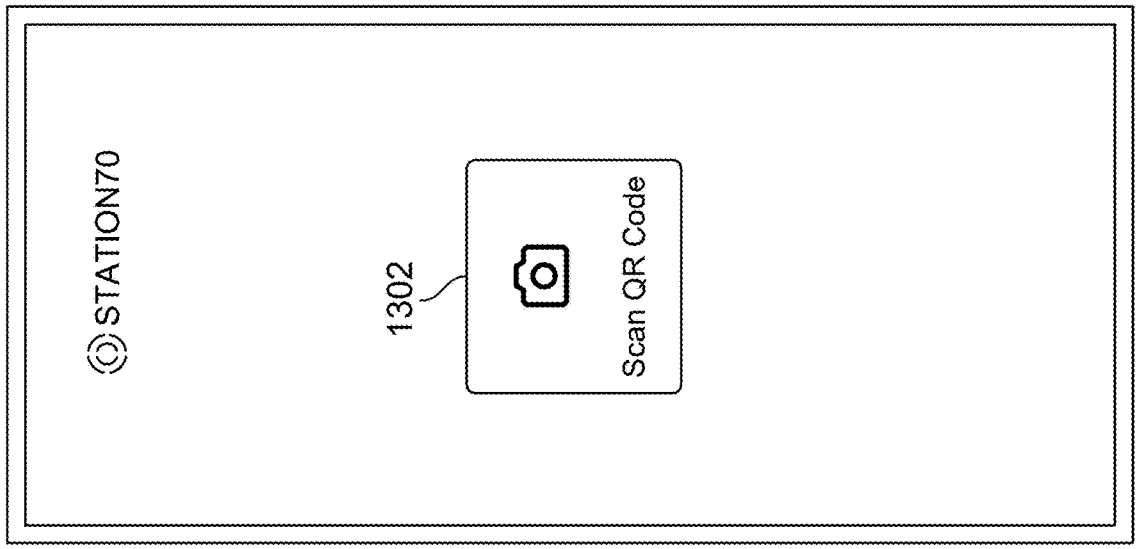
FIG. 13B shows an example user interface that is provided by the authenticator app after the user selection of "Scan QR Code" button 1302 in FIG. 13A to show the QR code that is captured by the activated camera sensor of the device.
Figure 13A:
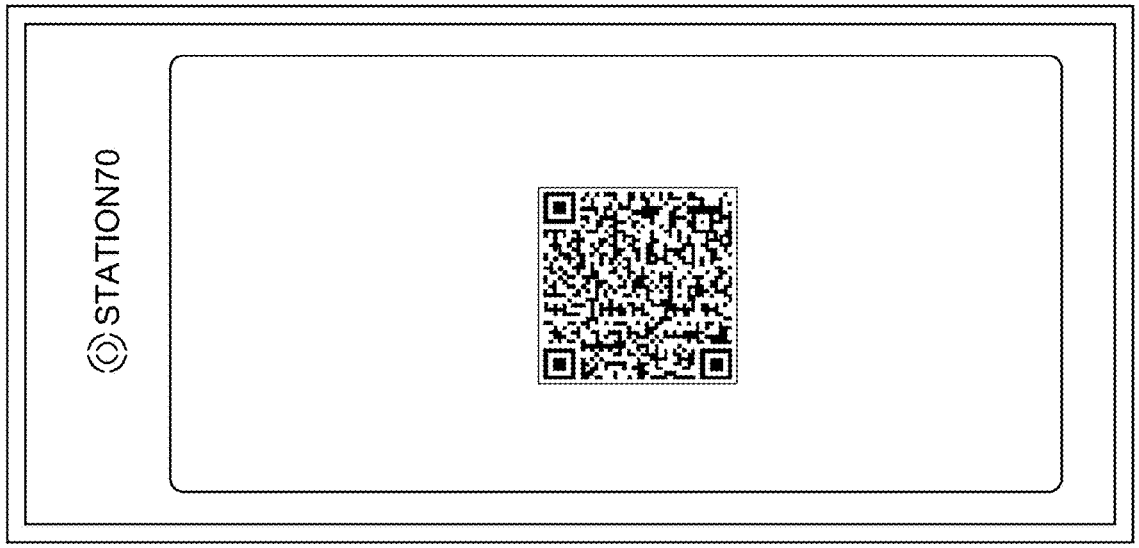
FIG. 13A shows an example user interface that is provided by the authenticator app to capture a QR code that is provided by an enterprise service platform to enroll a new source service account and corresponding TOTP secret key into the MFA workflow management service.

FIG. 13A shows an example user interface that is provided by the authenticator app to capture a QR code that is provided by an enterprise service platform to enroll a new source service account and corresponding TOTP secret key into the MFA workflow management service. For example, the same user who was shown the enterprise application user interface of FIG. 12 (e.g., at a first device) opens the authenticator app (e.g., that is executing on a second device, which may be a different device from the first device) and selects "Scan QR Code" button 1302.

FIG. 13B shows an example user interface that is provided by the authenticator app after the user selection of "Scan QR Code" button 1302 in FIG. 13A to show the QR code that is captured by the activated camera sensor of the device. In the example of FIG. 13B, the QR code that is captured by the camera within the authenticator app is the QR code that is issued by the enterprise service platform in FIG. 12.

Figure 13D:
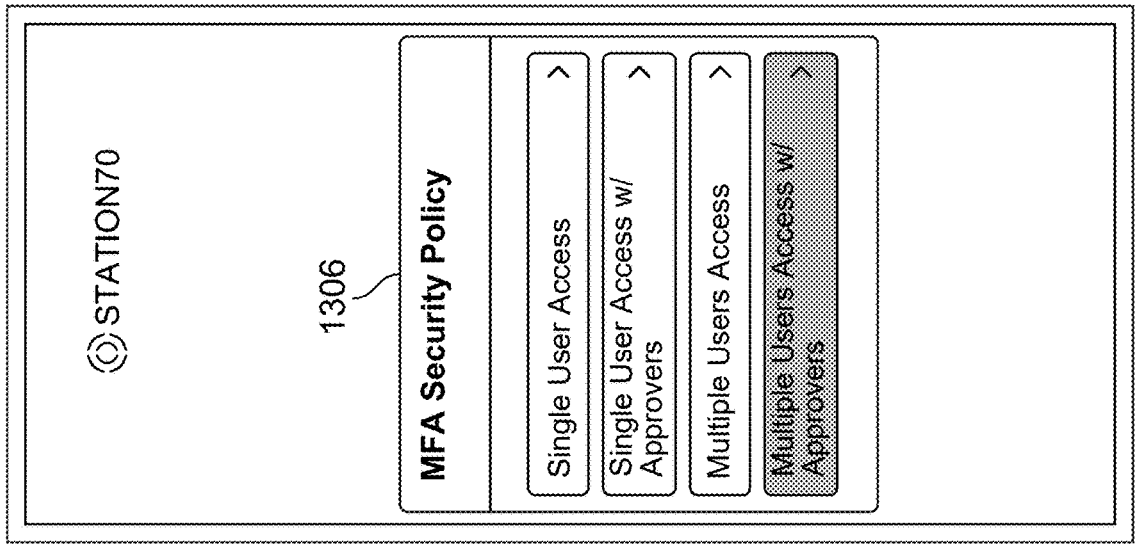
FIG. 13D shows an example user interface of the authenticator app that is presenting a security policy configuration form for selecting the access mode to be associated with the source service account for which the QR code was ingested by the authenticator app of FIG. 13B.
Figure 13C:
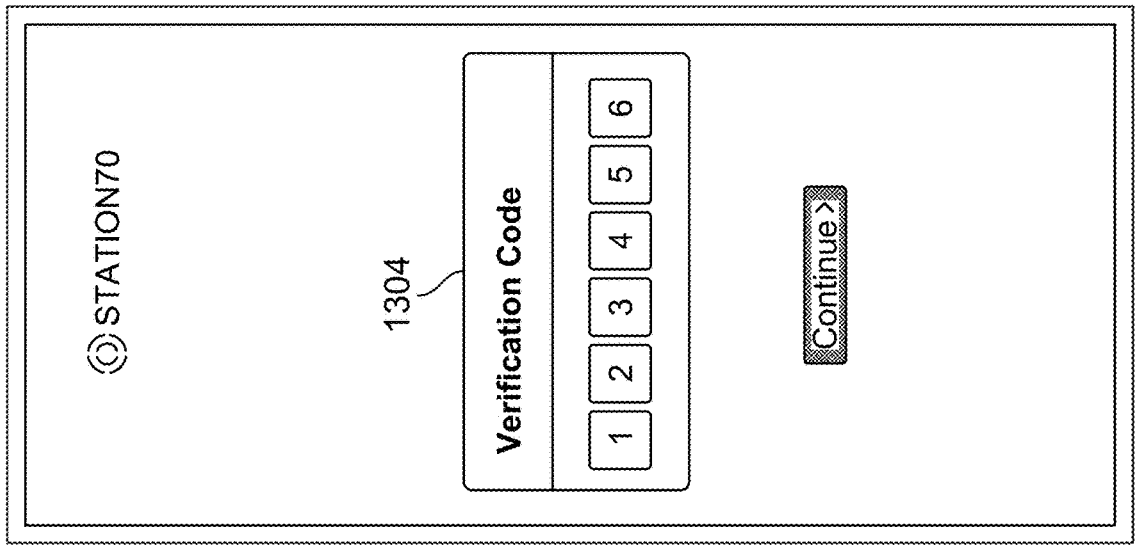
FIG. 13C shows an example user interface that is presenting a verification code that is provided by the authenticator app in response to the ingestion of the QR code that was captured in FIG. 13B.

FIG. 13C shows an example user interface that is presenting a verification code that is provided by the authenticator app in response to the ingestion of the QR code that was captured in FIG. 13B. In this example, after the QR code that was captured in FIG. 13B, the authenticator app had sent the QR code to the MFA workflow management server, at which the TOTP secret key that was derived from the captured QR code is used (along with the current time) to generate a TOTP passcode. The generated TOTP passcode is then sent back to the authenticator app to be presented as the "verification code," which the user can manually copy into the verification code prompt of section 1204 of the enterprise application user interface as shown in FIG. 12 to finish the MFA enabling process at the enterprise service platform.

FIG. 13D shows an example user interface of the authenticator app that is presenting a security policy configuration form for selecting the access mode to be associated with the source service account for which the QR code was ingested by the authenticator app of FIG. 13B. In the example described in FIGS. 12 through 13G, the enrolling user is able to configure the relevant security policy for a source service account during the enrollment process. Form 1306 prompts the user to select one access mode among the options of: "single user access," "single user access w/approvers," "multiple user access," and "multiple user access w/approvers." As shown in FIG. 13D, the "multiple user access w/approvers" mode was selected to allow multiple users to share access to the source service account but requiring a quorum of approving users prior to generating a TOTP passcode.

Figure 13G:
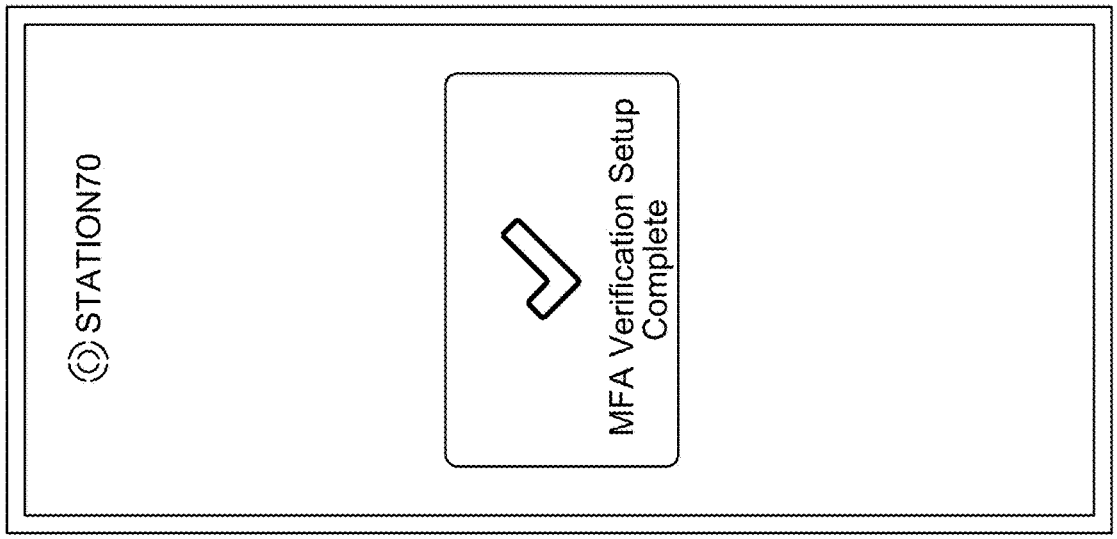
FIG. 13G shows an example user interface that is presenting a confirmation that the source service account for which the QR code was ingested by the authenticator app of FIG. 13B has been successfully enrolled at the MFA workflow management server.
Figure 13F:
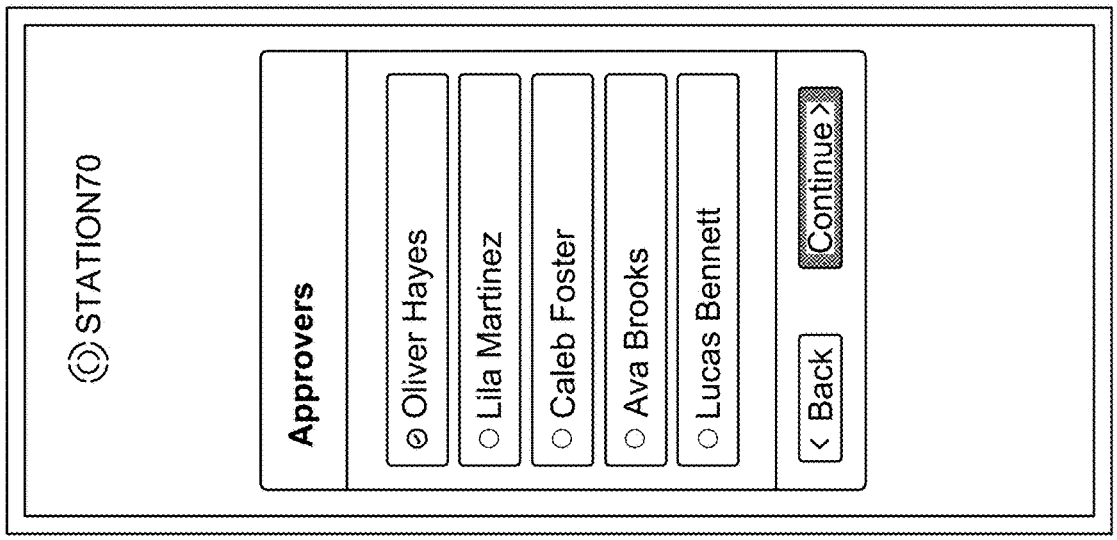
FIG. 13F shows an example user interface of the authenticator app that is presenting a security policy configuration form for selecting authorized users to be associated with the source service account for which the QR code was ingested by the authenticator app of FIG. 13B.
Figure 13E:
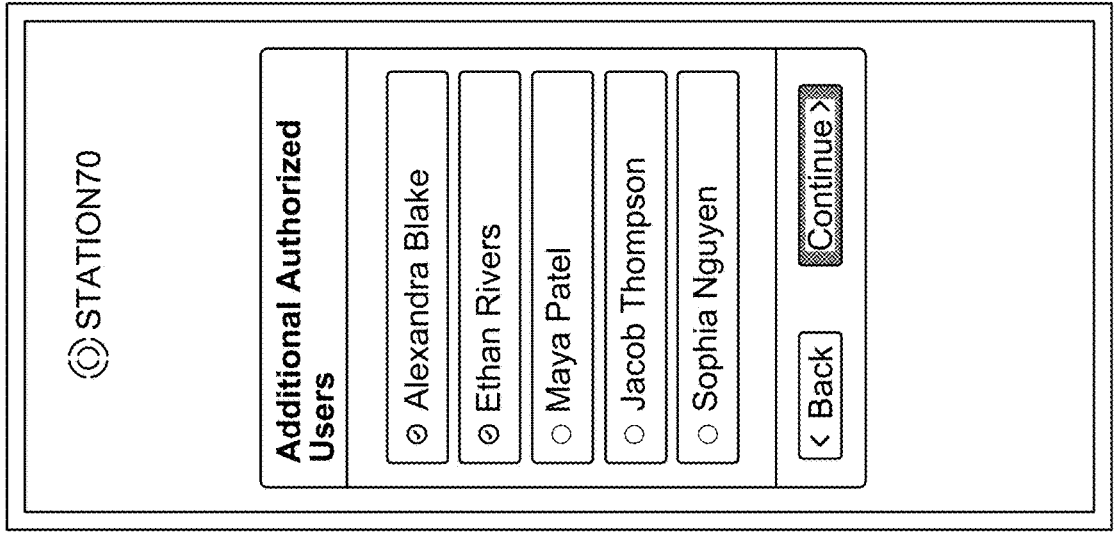
FIG. 13E shows an example user interface of the authenticator app that is presenting a security policy configuration form for selecting authorized users to be associated with the source service account for which the QR code was ingested by the authenticator app of FIG. 13B.

FIG. 13E shows an example user interface of the authenticator app that is presenting a security policy configuration form for selecting authorized users to be associated with the source service account for which the QR code was ingested by the authenticator app of FIG. 13B. Specifically in the example of FIG. 13E, candidate users are presented at the user interface to enable the configuring user to select one or more of the candidates to designate as authorized users to access the MFA-protected account in addition to the configuring/enrolling user, who is by default an authorized user of the account.

FIG. 13F shows an example user interface of the authenticator app that is presenting a security policy configuration form for selecting authorized users to be associated with the source service account for which the QR code was ingested by the authenticator app of FIG. 13B. Specifically in the example of FIG. 13F, candidate users are presented at the user interface to enable the configuring user to select one or more of the candidates to designate as approver users to approve of an authorized user's requested access to the MFA-protected account. For example, the approver users can include different users than the authorized users and so as to provide an additional layer of oversight as to who is requesting and also when the request is made to the MFA-protected account at the enterprise service platform.

FIG. 13G shows an example user interface that is presenting a confirmation that the source service account for which the QR code was ingested by the authenticator app of FIG. 13B has been successfully enrolled at the MFA workflow management server. At the MFA workflow management server, the source service account and its corresponding TOTP secret key have been successfully enrolled in the configured security policy, which also means that the encrypted TOTP secret key is stored in a cloud-based secure storage and that a key share of the private key corresponding to the public key that was used to encrypt the TOTP secret key has been pushed down to the device of each authorized user (e.g., as shown in process 500 of FIG. 5 or process 600 of FIG. 6).

Figure 14A:
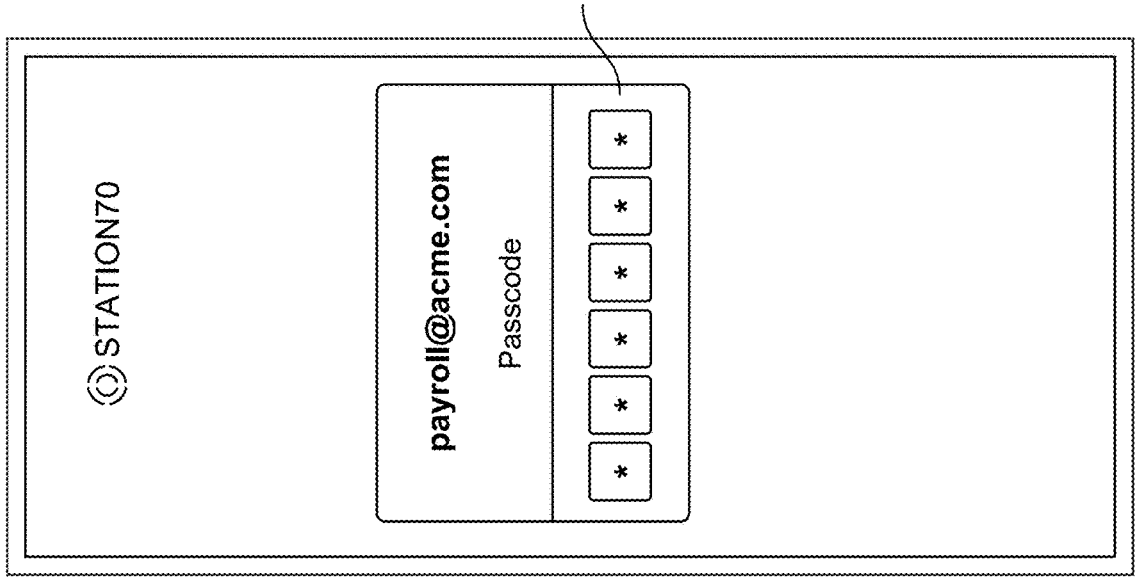
FIG. 14A shows an example user interface at an authenticator app for requesting a passcode to complete an MFA process for a source enterprise service account in accordance with some embodiments.

FIG. 14A shows an example user interface at an authenticator app for requesting a passcode to complete an MFA process for a source enterprise service account in accordance with some embodiments. In the example of FIG. 14A, the source service account associated with an enterprise payroll platform that is identified as "payroll@acme.com" is protected by MFA by the platform. Furthermore the "payroll@acme.com" source service account and its corresponding TOTP secret key were previously enrolled at the MFA workflow management server. In the example of FIG. 14A, an authorized user as described in the security policy associated with that account wants to access the "payroll@acme.com" account using a payroll enterprise application (not shown in FIG. 14A) and as such, opens the authenticator app on their device. To complete the MFA process that is provided by the enterprise payroll platform (for which a user interface is not shown in FIG. 14A), the user can select within the authenticator app user interface, placeholder passcode 1402 corresponding to the "payroll@acme.com" account. In response to the user selection of passcode section 1402, which is showing a 6-digit placeholder value ("******"), the authenticator app will issue an access request to the MFA workflow management server. Then, in accordance with a process such as process 800 of FIG. 8 or process 900 of FIG. 9, depending on whether the security policy requires approvers, and as described in process 1100 of FIG. 11, the TOTP passcode corresponding to the account is generated and then presented within the authenticator app.

Figure 14B:
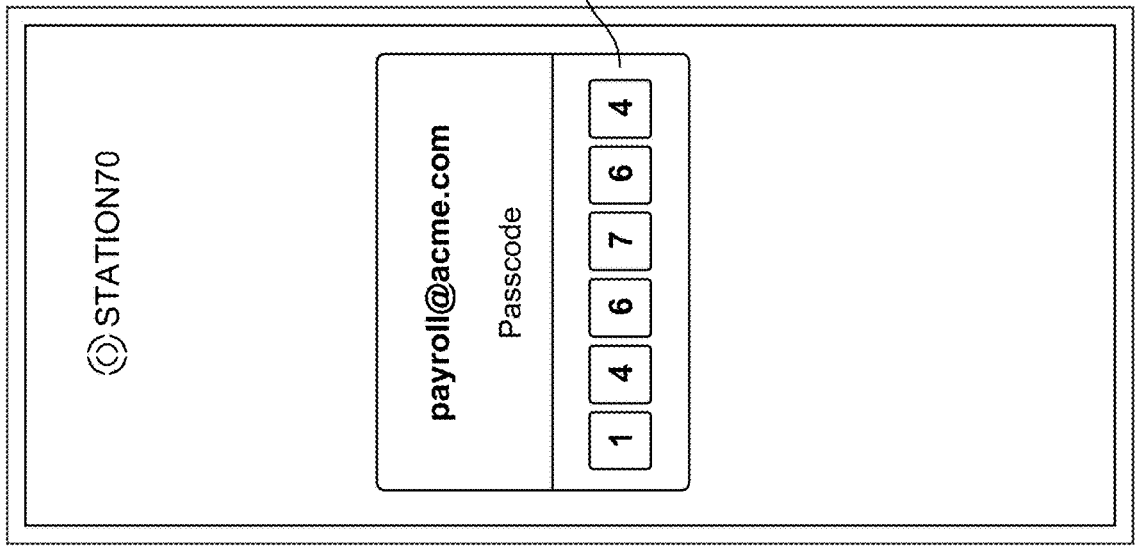
FIG. 14B shows an example user interface at an authenticator app that is displaying a generated TOTP passcode that was requested for "payroll@acme.com" account.

FIG. 14B shows an example user interface at an authenticator app that is displaying a generated TOTP passcode that was requested for "payroll@acme.com" account. After the access request that was initiated in response to the user selection of placeholder passcode 1402, the generated six-digit TOTP passcode 1404 is presented within the authenticator app. The user can then copy the six-digit TOTP passcode 1404 presented within the authenticator app ("146764") into an MFA-related user interface of the enterprise payroll platform (not shown in FIG. 14B) to gain access into the "payroll@acme.com" account.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a security policy storage configured to store a security policy that describes a set of authorized users associated with an account at a source service platform;
 a secure key storage configured to store a stored key share corresponding to an encrypted secret key corresponding to the account at the source service platform; and
 one or more processors configured to:

receive, from a device, a request to complete a multi-factor authentication (MFA) process for the account at the source service platform;

verify, based at least in part on the security policy, that a user associated with the request is included in the set of authorized users that is permitted to access the encrypted secret key;

decrypt the encrypted secret key using the stored key share and a received key share included in the request; and cause a passcode corresponding to the MFA process for the account at the source service platform to be generated for the device based at least in part on the decrypted secret key.

2. The system of claim 1, wherein the decrypted secret key comprises a time-based one-time password (TOTP) secret key and wherein the passcode comprises a TOTP passcode.

3. The system of claim 1, wherein the one or more processors are configured to query an identity and access management server whether the user is permitted to use an authenticator application associated with a multi-factor authentication (MFA) workflow management service.

4. The system of claim 1, wherein the user comprises a first user, wherein the device comprises a first device, and the one or more processors are further configured to:

receive, from a second device, an enrollment request associated with the account, wherein the enrollment request includes a quick-response (QR) code that was issued by the source service platform for the account;

derive a secret key associated with the account from the QR code;

associate the secret key with the security policy;

obtain a private key-public key pair corresponding to the secret key;

encrypt the secret key using a public key of the private key-public key pair;

divide a private key of the private key-public key pair into a plurality of key shares;

transmit a first key share of the plurality of key shares to the first device and the second device due to the first device and the second device being associated with the set of authorized users as described in the security policy; and store a second key share of the plurality of key shares at the secure key storage.

5. The system of claim 4, wherein the private key-public key pair corresponding to the secret key is generated by a hardware security module (HSM).

6. The system of claim 4, wherein the one or more processors are further configured to store a third key share of the plurality of key shares at a semi-offline secure storage.

7. The system of claim 4, wherein to divide the private key of the private key-public key pair into the plurality of key shares comprises to use a key sharing cryptographic scheme.

8. The system of claim 1, wherein the secure key storage comprises a hardware security module (HSM).

9. The system of claim 1, wherein the received key share included in the request was stored in a secure enclave of the device.

10. The system of claim 1, wherein to decrypt the encrypted secret key using the stored key share and the received key share comprises to:

cryptographically combine the received key share and the stored key share to generate a private key; and decrypt the encrypted secret key using the private key, wherein the encrypted secret key was generated using a public key that is from a private key-public key pair associated with the private key.

11. The system of claim 1, wherein to cause the passcode corresponding to the MFA process for the account at the source service platform to be generated comprises to:

generate the passcode based on the decrypted secret key and a current time; and send the passcode to the device, wherein the passcode is to be presented within an authenticator application executing at the device.

12. The system of claim 1, wherein to cause the passcode corresponding to the MFA process for the account at the source service platform to be generated comprises to:

generate N passcodes based on the decrypted secret key and a plurality of times; and send the N passcodes to the device, wherein the N passcodes are to be cached at the device.

13. The system of claim 1, wherein prior to the decryption of the encrypted secret key using the stored key share and the received key share, the one or more processors are further configured to:

send notifications to devices associated with one or more approver users that are specified in the security policy;

receive one or more approvals from the devices associated with the one or more approver users; and determine that the one or more approvals meet a set of approval criteria.

14. A method, comprising:

receiving, from a device, a request to complete a multi-factor authentication (MFA) process for an account at a source service platform;

verifying, based at least in part on a security policy, that a user associated with the request is included in a set of authorized users that is permitted to access an encrypted secret key corresponding to the account at the source service platform, wherein the security policy describes the set of authorized users associated with the account at the source service platform;

decrypting the encrypted secret key using a stored key share and a received key share included in the request, wherein the stored key share corresponding to the encrypted secret key is stored at a secure key storage; and causing a passcode corresponding to the MFA process for the account at the source service platform to be generated for the device based at least in part on the decrypted secret key.

15. The method of claim 14, further comprising querying an identity and access management server whether the user is permitted to use an authenticator application associated with a multi-factor authentication (MFA) workflow management service.

16. The method of claim 14, wherein the user comprises a first user, wherein the device comprises a first device, and the method further comprising:

receiving, from a second device, an enrollment request associated with the account, wherein the enrollment request includes a quick-response (QR) code that was issued by the source service platform for the account;

deriving a secret key associated with the account from the QR code;

associating the secret key with the security policy;

obtaining a private key-public key pair corresponding to the secret key;

encrypting the secret key using a public key of the private key-public key pair;

dividing a private key of the private key-public key pair into a plurality of key shares;

transmitting a first key share of the plurality of key shares to the first device and the second device due to the first device and the second device being associated with the set of authorized users as described in the security policy; and storing a second key share of the plurality of key shares at the secure key storage.

17. The method of claim 14, wherein the secure key storage comprises a hardware security module (HSM).

18. The method of claim 14, wherein the received key share included in the request was stored in a secure enclave of the device.

19. The method of claim 14, wherein decrypting the encrypted secret key using the stored key share and the received key share comprises:

cryptographically combining the received key share and the stored key share to generate a private key; and decrypting the encrypted secret key using the private key, wherein the encrypted secret key was generated using a public key that is from a private key-public key pair associated with the private key.

20. The method of claim 14, wherein causing the passcode corresponding to the MFA process for the account at the source service platform to be generated comprises:

generating the passcode based on the decrypted secret key and a current time; and sending the passcode to the device, wherein the passcode is to be presented within an authenticator application executing at the device.

\* \* \* \* \*